(12) United States Patent
Jung et al.

(10) Patent No.: US 12,211,499 B2
(45) Date of Patent: Jan. 28, 2025

(54) ELECTRONIC DEVICE MOUNTED IN VEHICLE, AND METHOD OF OPERATING THE SAME

(71) Applicant: Samsung Electronics Co., Ltd., Gyeonggi-do (KR)

(72) Inventors: Minsu Jung, Gyeonggi-do (KR); Hyunwoo Kang, Gyeonggi-do (KR); Taejun Kim, Gyeonggi-do (KR); Jonghee Choi, Gyeonggi-do (KR); Woong Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 250 days.

(21) Appl. No.: 17/748,128

(22) Filed: May 19, 2022

(65) Prior Publication Data
US 2022/0415321 A1    Dec. 29, 2022

Related U.S. Application Data

(63) Continuation of application No. PCT/KR2022/005406, filed on Apr. 14, 2022.

(30) Foreign Application Priority Data

Jun. 25, 2021   (KR) ........................ 10-2021-0083184

(51) Int. Cl.
*G10L 15/22* (2006.01)
*B60K 35/00* (2024.01)
(Continued)

(52) U.S. Cl.
CPC .............. *G10L 15/22* (2013.01); *B60K 35/00* (2013.01); *B60K 35/60* (2024.01); *B60K 35/10* (2024.01);
(Continued)

(58) Field of Classification Search
None
See application file for complete search history.

(56) References Cited

U.S. PATENT DOCUMENTS 9,248,788 B2 *  2/2016 Sekiguchi ............... G10L 15/22
9,305,555 B2    4/2016 Kato et al.
(Continued)

FOREIGN PATENT DOCUMENTS

CN    112540741 A    3/2021
EP     3603040 B1    8/2022
(Continued)

OTHER PUBLICATIONS

International Search Report dated Jul. 6, 2022.

*Primary Examiner* — Jonathan C Kim
(74) *Attorney, Agent, or Firm* — Cha & Reiter, LLC

(57) ABSTRACT

A method and electronic device for a vehicle are disclosed herein. The electronic device is mounted in the vehicle and includes a display, a memory storing voice commands, and a processor. The processor implements the method, including: obtaining at least one of vehicle driving information, occupant information, or display output information, generating one or more short commands by shortening one or more of the voice commands, based on the obtained at least one of the vehicle driving information, the occupant information and the display output information, and controlling the display to display one or more voice command guidance user interface (UI) displaying the one or more short commands.

11 Claims, 18 Drawing Sheets

(51) Int. Cl.
  *B60K 35/10* (2024.01)
  *B60K 35/28* (2024.01)
  *B60K 35/60* (2024.01)

(52) U.S. Cl.
  CPC ...... *B60K 35/28* (2024.01); *B60K 2360/1438* (2024.01); *B60K 2360/148* (2024.01); *B60K 2360/164* (2024.01); *B60K 2360/166* (2024.01); *B60K 2360/167* (2024.01); *G10L 2015/223* (2013.01)

(56) References Cited

U.S. PATENT DOCUMENTS

| | | | |
|---|---|---|---|
| 9,404,765 B2 | 8/2016 | Jiyama et al. | |
| 9,666,189 B2 | 5/2017 | Lee et al. | |
| 10,347,246 B2* | 7/2019 | Lee | G06F 3/0482 |
| 10,831,268 B1* | 11/2020 | Golard | G06F 3/167 |
| 11,158,327 B2* | 10/2021 | Choi | G10L 17/18 |
| 2007/0033055 A1* | 2/2007 | Tanaka | G10L 15/22 |
| | | | 704/E15.04 |
| 2010/0153111 A1* | 6/2010 | Hirai | G06F 3/0488 |
| | | | 715/825 |
| 2010/0312547 A1* | 12/2010 | Van Os | G10L 15/26 |
| | | | 704/E15.04 |
| 2011/0257973 A1* | 10/2011 | Chutorash | G06F 3/1454 |
| | | | 701/1 |
| 2012/0245945 A1* | 9/2012 | Miyauchi | G10L 15/06 |
| | | | 704/E11.001 |
| 2012/0271636 A1* | 10/2012 | Fujisawa | G10L 15/22 |
| | | | 704/E15.001 |
| 2013/0307771 A1* | 11/2013 | Parker | G06F 3/167 |
| | | | 345/158 |
| 2014/0136013 A1* | 5/2014 | Wolverton | B60K 35/00 |
| | | | 701/1 |
| 2015/0006167 A1* | 1/2015 | Kato | G01C 21/3608 |
| | | | 704/231 |
| 2015/0211878 A1* | 7/2015 | Jiyama | G01C 21/3629 |
| | | | 701/439 |
| 2016/0240189 A1* | 8/2016 | Lee | G10L 15/22 |
| 2017/0075653 A1* | 3/2017 | Dawidowsky | G06F 3/167 |
| 2017/0323641 A1* | 11/2017 | Shimizu | G01C 21/36 |
| 2018/0093673 A1* | 4/2018 | Yuhara | B60W 50/10 |
| 2018/0130467 A1* | 5/2018 | Chikuri | G10L 15/22 |
| 2018/0357040 A1* | 12/2018 | Spiewla | G06F 3/0488 |
| 2020/0073629 A1* | 3/2020 | Lee | G06F 9/4843 |
| 2020/0075006 A1* | 3/2020 | Chen | G10L 15/22 |
| 2020/0111489 A1* | 4/2020 | Kuramochi | B60K 35/26 |
| 2020/0265065 A1* | 8/2020 | Ashe | G06F 16/90332 |
| 2020/0320998 A1* | 10/2020 | Wagatsuma | G10L 15/22 |
| 2021/0149397 A1* | 5/2021 | Shin | G06V 20/56 |
| 2021/0233528 A1* | 7/2021 | Maeda | G06F 3/167 |
| 2022/0415321 A1* | 12/2022 | Jung | G06F 3/167 |

FOREIGN PATENT DOCUMENTS

| | | |
|---|---|---|
| JP | 6348831 B2 | 6/2018 |
| KR | 10-2018-0025379 A | 3/2018 |
| KR | 10-1860731 B1 | 5/2018 |
| KR | 10-2018-0109631 A | 10/2018 |
| KR | 10-1971513 B1 | 4/2019 |
| KR | 10-2019-0106943 A | 9/2019 |
| KR | 10-2016-0044652 B1 | 4/2021 |
| KR | 10-2021-0059860 A | 5/2021 |

\* cited by examiner

ELECTRONIC DEVICE MOUNTED IN VEHICLE, AND METHOD OF OPERATING THE SAME

CROSS-REFERENCE TO RELATED APPLICATION(S)

This application is a continuation of International Application No. PCT/KR2022/005406, which was filed on Apr. 14, 2022, and claims priority to Korean Patent Application No. 10-2021-0083184, filed on Jun. 25, 2021, in the Korean Intellectual Property Office, the disclosures of which are incorporated by reference herein their entirety.

BACKGROUND

Technical Field

The disclosure relates to vehicular electronic devices, and more particularly, to customized voice recognition for vehicular electronic devices having display screens.

Description of Related Art

With the development of voice recognition technology, many vehicles today allow for functional control using driver voice inputs. Such vehicular voice recognition functions can be divided into sub-functions, such as a general voice agent that receives voice inputs from the driver and executes functions of the vehicle or included in the vehicle, and a voice access application which detects a status of a display screen and a situation within the vehicle and provides a list of available voice recognition functions.

In many such implementations, the general voice agent does not provide guidance for the voice command list, and thus, a user often does not know which voice command to utter in order to execute a desired function. Therefore, when the user utters a particular voice command, the vehicle may respond by inquiring for a parameter utilized to execute a corresponding function, and the user is prompted to utter a parameter in response to the vehicle inquiry, which is cumbersome.

For example, in order to advance to a next song in a music application, a driver may utter, "Play next song." However, the vehicle may fail to determine whether the voice command relates to the music application, and may further fail to distinguish advancing to a next song within a current play list, or searching for a song entitled "next song." Therefore, the electronic device in the vehicle may output an inquiry message such as, "Did you mean to play the next song of the currently playlist within the music application?" to detect parameter information related to the voice command of the driver. The driver then may utter an additional answer, such as, "Yes. Play the next song in the music application" in response to the inquiry message.

In such cases, because more interactions between the driver are the vehicular electronic device are utilized for voice navigation, the driver's fatigue may increase, and there is more risk of distracted driving and possible accidents. Furthermore, because of the inconvenience imposed, the voice recognition function may not be much utilized by the driver.

Furthermore, the voice access application, which includes display of a voice command list, necessitates display of a plurality of information, which may further contribute to distracted driving. The information displayed therein further displays the entire command list, and does not account for user, driver, occupants, environment and context to selectively display information.

SUMMARY

The present disclosure provides a vehicle and electronic device that reduces a requisite quantity of interactions between drivers and electronic devices for voice recognition. The disclosure increases the accuracy of voice recognition by providing more guidance for user interface (UI) interactions, by visually representing voice commands for functions of the electronic device or vehicle.

According to certain embodiments of the disclosure, an electronic device mounted in a vehicle is disclosed. The electronic device includes a display, a memory storing voice commands executable by voice input to execute one or more functions of the vehicle or the electronic device, and a program including one or more instructions, and a processor configured to execute the one or more instructions to cause the electronic device to obtain at least one of vehicle driving information, occupant information, or display output information, generate one or more short commands by shortening one or more of the voice commands, based on the obtained at least one of the vehicle driving information, the occupant information and the display output information, and control the display to display one or more voice command guidance user interface (UI) displaying the one or more short commands.

The processor may be further configured to execute the one or more instructions to obtain user identification information and usage history information of an occupant, obtain information about applications frequently used by the occupant, based on the user identification information and the usage history information, and generate the one or more short commands by shortening commands for executing functions of the frequently used applications.

The processor may be further configured to execute the one or more instructions to detect functions represented by one or more graphical user interfaces (GUIs) output on the display, based on the display output information, and generate the one or more short commands corresponding to the one or more GUIs by converting the detected functions into a natural language.

The processor may be further configured to execute the one or more instructions to control the display to display the one or more voice command guidance UIs at a location correspondingly adjacent to one or more GUIs representing functions corresponding to the one or more voice command guidance UIs.

The display may include a plurality of displays corresponding to seats included in the vehicle, and the processor may be further configured to execute the one or more instructions to receive, from an occupant in the vehicle, a user input for activating a voice recognition function, activate, in response to the user input, the voice recognition function of a display corresponding to a seat occupied by the occupant from among the plurality of displays, and control the display to display the one or more voice command guidance UIs.

The processor may be further configured to execute the one or more instructions to determine a safe speed based on information about a current location, a driving road, and a driving speed of the vehicle, included in the vehicle driving information, determine weights of the one or more voice command guidance UIs based on at least one of the vehicle driving information, the occupant information, the display output information, or the determined safe speed, and determine a number, location, and size of the one or more voice command guidance UIs to be displayed, based on the determined weights.

The processor may be further configured to execute the one or more instructions to determine whether the driving speed of the vehicle is greater than the safe speed, based on the vehicle driving information, and adjust a weight of one or more first voice command guidance UIs for executing functions related to driving of the vehicle and a weight of one or more second voice command guidance UIs for executing convenience functions not related to driving of the vehicle, based on a result of determining the driving speed of the vehicle.

The processor may be further configured to execute the one or more instructions to adjust a weight of a voice command guidance UI for executing a function for removing a pop-up message from the display when the pop-up message is output to be overlaid on GUIs displayed on the display.

The processor may be further configured to execute the one or more instructions to determine an area for displaying the one or more voice command guidance UIs on the display, based on a distance between a location of an occupant and the display, and control the display to display the one or more voice command guidance UIs on the determined area.

The electronic device may further include a microphone receiving a voice input uttered by an occupant, and the processor may be further configured to execute the one or more instructions to identify a short command corresponding to the voice input received through the microphone, by comparing the voice input to the one or more short commands represented by the one or more voice command guidance UIs, and execute a function corresponding to the identified short command.

According to an embodiment of the disclosure, a method of operating an electronic device mounted in a vehicle is disclosed, including: storing, in a memory, voice commands executable by voice input to execute one or more functions of the vehicle or the electronic device, obtaining at least one of vehicle driving information, occupant information, or display output information, generating, via at least one processor, one or more short commands by shortening one or more of the voice commands, based on the obtained at least one of the vehicle driving information, the occupant information and the display output information, and displaying one or more voice command guidance user interfaces (UI) displaying the generated one or more short commands.

The obtaining of the information may include obtaining user identification information and usage history information of the occupant, and obtaining information about applications frequently used by the occupant, based on the user identification information and the usage history information, and the generating of the one or more short commands may include generating the one or more short commands by shortening commands for executing functions of the frequently used applications.

The obtaining of the information may include detecting functions represented by one or more graphical user interfaces (GUIs) output on a display, and the generating of the one or more short commands may include generating the one or more short commands corresponding to the one or more GUIs by converting the detected functions into a natural language.

The displaying of the one or more voice command guidance UIs may include displaying the one or more voice command guidance UIs at a location correspondingly adjacent to one or more GUIs representing functions corresponding to the one or more voice command guidance UIs.

The electronic device may include a plurality of displays corresponding to a driver's seat, a passenger seat, and rear seats included in the vehicle, and the displaying of the one or more voice command guidance UIs may include receiving, from an occupant occupying at least one of the driver's seat, the passenger seat, or the rear seats, a user input for activating a voice recognition function, activating, in response to the user input, the voice recognition function of a display corresponding to the seat occupied by the occupant from among the plurality of displays, and displaying the one or more voice command guidance UIs on the display.

The method may further include determining a safe speed based on information about a current location, a driving road, and a driving speed of the vehicle, included in the vehicle driving information, and the displaying of the one or more voice command guidance UIs may include determining weights of the one or more voice command guidance UIs based on at least one of the vehicle driving information, the occupant information, the display output information, or the determined safe speed, determining a number, location, and size of the one or more voice command guidance UIs to be displayed, based on the determined weights, and displaying the one or more voice command guidance UIs based on the determined number, location, and size.

The obtaining of the information may include determining whether the driving speed of the vehicle is greater than the safe speed, based on the vehicle driving information, and the determining of the weights of the one or more voice command guidance UIs may include adjusting a weight of one or more first voice command guidance UIs for executing functions related to driving of the vehicle and a weight of one or more second voice command guidance UIs for executing convenience functions not related to driving of the vehicle, based on a result of determining the driving speed of the vehicle.

The determining of the weights of the one or more voice command guidance UIs may include adjusting a weight of a voice command guidance UI for executing a function for removing a pop-up message from a display when the pop-up message is output to be overlaid on GUIs displayed on the display.

The obtaining of the information may include obtaining information about a seat location of the occupant, and the displaying of the one or more voice command guidance UIs may include determining an area for displaying the one or more voice command guidance UIs on a display, based on a distance between the seat location of the occupant and the display, and displaying the one or more voice command guidance UIs on the determined area.

According to an embodiment of the disclosure, there is provided a computer-readable recording medium having recorded thereon a program to be executed in a computer.

DETAILED DESCRIPTION

Figure 1:
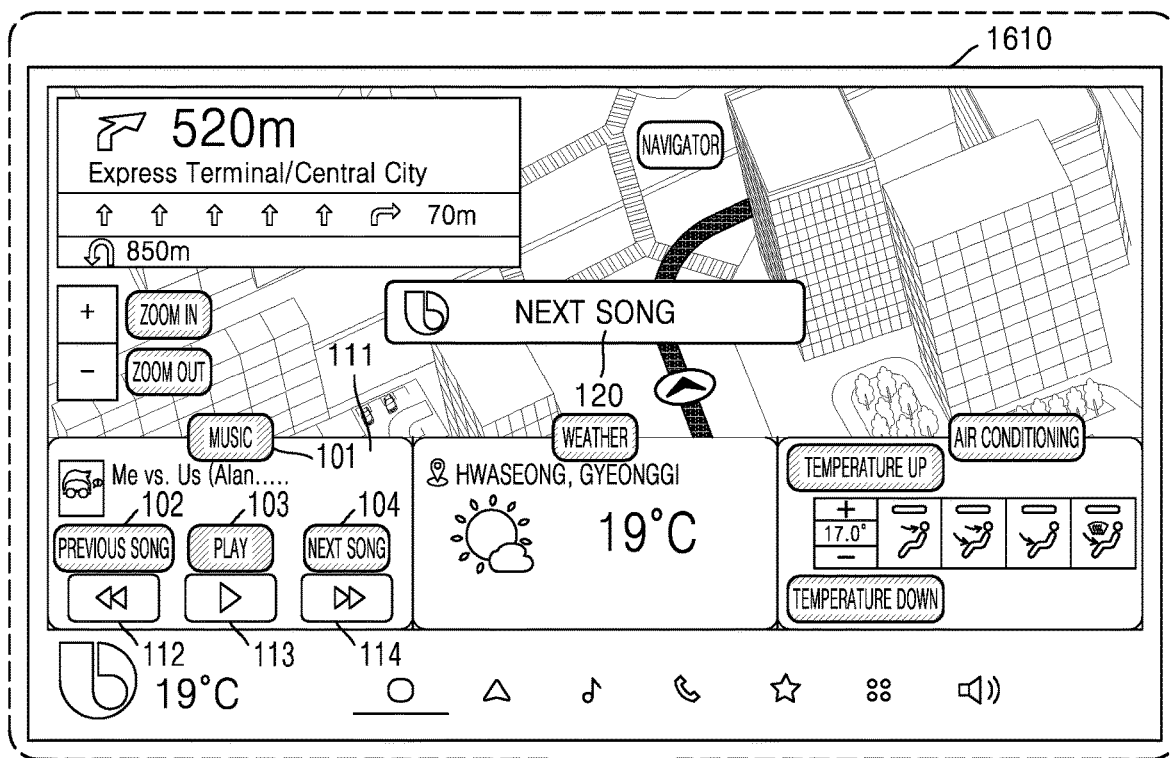
FIG. 1 is a conceptual diagram showing an electronic device displaying voice command guidance user interfaces (UIs), according to an embodiment of the disclosure.
Figure 1:
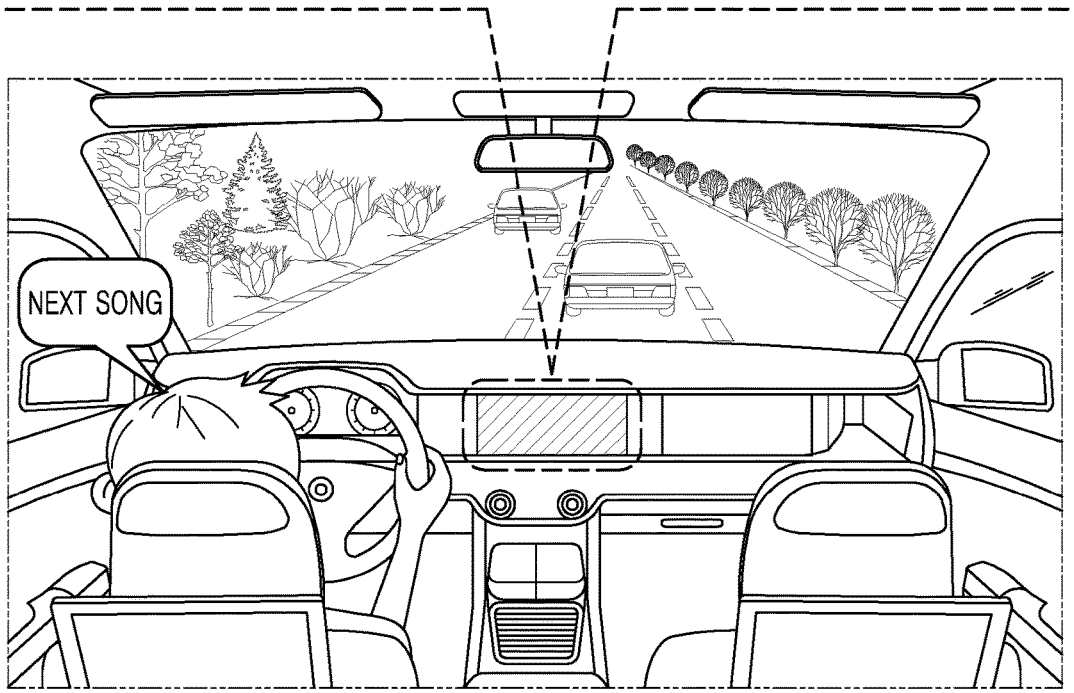

Throughout the disclosure, the expression "at least one of a, b or c" indicates only a, only b, only c, both a and b, both a and c, both b and c, all of a, b, and c, or variations thereof.

Although the terms used herein are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. In a particular case, terms that are arbitrarily selected by the applicant may be used and, in this case, the meanings of these terms may be described in relevant parts of the disclosure. Therefore, it is noted that the terms used herein are construed based on practical meanings thereof and the whole content of this specification, rather than being simply construed based on names of the terms.

As used herein, the singular forms "a", "an", and "the" are intended to include the plural forms as well, unless the context clearly indicates otherwise. All terms (including technical and scientific terms) used herein have the same meaning as generally understood by one of ordinary skill in the art.

It will be understood that the terms "comprises", "comprising", "includes" and/or "including", when used herein, specify the presence of stated elements, but do not preclude the presence or addition of one or more other elements, unless otherwise indicated herein. As used herein, the term "unit" or "module" denotes an entity for performing at least one function or operation, and may be implemented as hardware, software, or a combination of hardware and software.

The phrase "configured to" as used herein may be interchangeably used with, for example, "suitable for", "having the capacity to", "designed to", "adapted to", "made to", or "capable of" depending on a situation. The phrase "configured to" may not necessarily represent only "specifically designed to" in terms of hardware. Instead, in a certain situation, the phrase "a system configured to" may represent that the system is "capable of" something in conjunction with other devices or components. For example, the phrase "a processor configured to perform A, B, and C" may refer to a dedicated processor (e.g., an embedded processor) for performing those operations, or a generic-purpose processor (e.g., a central processing unit (CPU) or an application processor (AP)) for performing those operations by executing one or more software programs stored in memory.

As used herein, a 'vehicle' refers to any type of vehicle that travels on the road, and more particularly, a vehicle having mounted an electronic device therein.

A 'voice input' refers to an input uttered by at least one occupant from among a driver, a front passenger, and rear passengers in the vehicle and received through a voice inputter (e.g., a microphone) of the electronic device.

A 'voice command' refers to a voice input uttered by an occupant to execute a function and/or an operation of the vehicle or the electronic device. The voice command may be, for example, "Navigate to destination" or "Play next song".

A 'short command' refers to a shortened command generated by extracting a keyword(s) of a command for executing a function and/or an operation of the vehicle or the electronic device. For example, the short command may be 'Destination' in order to get directions to a destination in a navigation application, or be 'Next song' in order to play a next song in a music application.

A 'short command list' is a list including one or more short commands.

Hereinafter, the disclosure will be described in detail by explaining embodiments thereof with reference to the attached drawings such that the embodiments may be easily carried out by one of ordinary skill in the art. The disclosure may, however, be embodied in many different forms and should not be construed as being limited to the embodiments set forth herein.

Reference will now be made in detail to embodiments of the disclosure, examples of which are illustrated in the accompanying drawings.

FIG. 1 is a conceptual diagram showing an electronic device 1000 displaying voice command guidance user interfaces (UIs) 101, 102, 103, and 104, according to an embodiment of the disclosure.

Referring to FIG. 1, the electronic device 1000 may be provided in a vehicle, and include a display 1610. In an embodiment of the disclosure, the display 1610 may include a center information display (OD), but is not limited thereto. The display 1610 may include at least one of, for example, a navigation device, a dashboard display, a head-up display (HUD), or a passenger display.

The electronic device 1000 may display, on the display 1610, the voice command guidance UIs 101, 102, 103, and 104 for inducing utterance of voice commands for executing functions of applications. The voice command guidance UIs 101, 102, 103, and 104 may include UIs for displaying voice commands for inducing utterance of an occupant to execute functions of the vehicle or the electronic device 1000 provided using applications, and may include text, numbers and symbols. In an embodiment of the disclosure, the voice command guidance UIs 101, 102, 103, and 104 may include graphical user interfaces (GUIs) (e.g., GUI elements). The voice command guidance UIs 101, 102, 103, and 104 may include one or more voice command guidance UIs.

The electronic device 1000 may display function UIs 111, 112, 113, and 114 for receiving user inputs for executing the functions of the applications. In an embodiment of the disclosure, the function UIs 111, 112, 113, and 114 may include at least one of widgets for displaying launch screens of the applications, or icons or button UIs representing the functions of the applications.

The voice command guidance UIs 101, 102, 103, and 104 may be provided and displayed at locations adjacent to their corresponding function UIs 111, 112, 113, and 114. In the embodiment of the disclosure shown in FIG. 1, the first voice command guidance UI 101 may include text for receiving a voice command such as 'Music,' may thus be displayed at a location adjacent to the first UI 111 for executing a music application. In addition, the second voice command guidance UI 102 including text such as 'Previous song' may be displayed at a location adjacent to the second UI 112 which is a button-type GUI for playing a previous song, the third voice command guidance UI 103 including text such as 'Play' may be displayed at a location adjacent to the third UI 113 that is provided as a button-type GUI for play (or pause), and the fourth voice command guidance UI 104 including text such as 'Next song' may be displayed at a location adjacent to the fourth UI 114 that is provided as a button-type GUI for playing a next song. In the embodiment of the disclosure shown in FIG. 1, in addition to 'Music', 'Previous song', 'Play', and 'Next song' mentioned above, the voice command guidance UIs 101, 102, 103, and 104 may further include 'Navigator', 'Zoom in', 'Zoom out', 'Weather', 'Air conditioning', 'Temperature up', or 'Temperature down' (e.g., 123 and 124, near phone 125 and favorites 126, in the menu of FIG. 12).

The electronic device 1000 may receive, from a driver, a user input for activating a voice recognition function, and based on the received user input, switch from a standby mode to a voice recognition mode for receiving a voice command. The electronic device 1000 may receive, for example, a button input requesting executing of the voice recognition function, or a touch input to a voice command related GUI element displayed on the display 1610. Upon receiving the user input, the electronic device 1000 may display a voice recognition UI 120 for receiving a voice input. The electronic device 1000 may receive, using the voice recognition UI 120, a voice input uttered by a driver. In the embodiment of the disclosure shown in FIG. 1, the electronic device 1000 may receive a voice input such as 'Next song' as uttered by a driver.

The electronic device 1000 may identify a voice command guidance UI 101, 102, 103, or 104 corresponding to the received voice input, by comparing the voice input to the names of each of the voice command guidance UIs 101, 102, 103, and 104 displayed on the display 1610. In the embodiment of the disclosure shown in FIG. 1, the electronic device 1000 may receive a voice input such as 'Next song' and identify the fourth voice command guidance UI 104 "next song" as corresponding to the received voice input, from among a plurality of voice command guidance UIs 101, 102, 103, and 104. Accordingly, the electronic device 1000 may execute a 'Play next song' function represented by the fourth voice command guidance UI 104.

In certain implementations, a voice agent provided by an electronic device of a vehicle may fail to provide guidance on a voice command list related to executable functions, and thus a driver or a passenger may not know which voice command should be uttered to execute a desired function. Therefore, when the driver utters a specific voice command, the electronic device of the vehicle may inquire about a parameter utilized to execute a function corresponding to the utterance, and the driver has to utter a specific parameter in response to the inquiry, which is cumbersome. For example, in order to play a next song in a music application, the driver may utter a voice command such as "Play next song". In this case, the electronic device in the vehicle may not determine whether the voice command of the driver is an utterance related to the music application, or whether the voice command indicates a next song of a currently playing song or indicates a song titled 'Next song'. Therefore, the electronic device in the vehicle may output an inquiry message such as "Do you mean to play the next song of the currently playing song in the music application?" to obtain or check parameter information related to the voice command of the driver. The driver needs to utter an additional voice command such as "Yes. Play the next song in the music application" in response to the inquiry message. In the above example, because interaction between the driver and the electronic device of the vehicle is increased when using the voice recognition function, fatigue of the driver may be increased and distracted driving may be caused, thus increasing the risk of accidents. In addition, due to the inconvenience of inputting additional parameter information, the driver may not frequently use the voice recognition function.

The electronic device 1000 according to the embodiment of the disclosure shown in FIG. 1 may display the voice command guidance UIs 101, 102, 103, and 104 for inducing utterance of voice commands related to the functions provided by the applications. As such, a driver or a passenger may intuitively understand a function desired to be executed, and function recognizability and user convenience may be increased. Furthermore, because the electronic device 1000 of the disclosure does not require utterance of an additional parameter information to execute a function and executes a function by receiving an utterance matching a voice command provided by the voice command guidance UI 101, 102, 103, or 104, interaction with the electronic device 1000 may be reduced which may thereby reduce distracted driving In addition, when the display 1610 is a large-size display or a multi-display including a plurality of displays, or when it is difficult for a driver or a passenger to directly touch-select the function UIs 111, 112, 113, and 114, the electronic device 1000 according to an embodiment of the disclosure may execute a related function by uttering a voice command displayed on the voice command guidance UI 101, 102, 103, or 104. As such, user experience (UX) such as voice touch may be provided.

Figure 2:
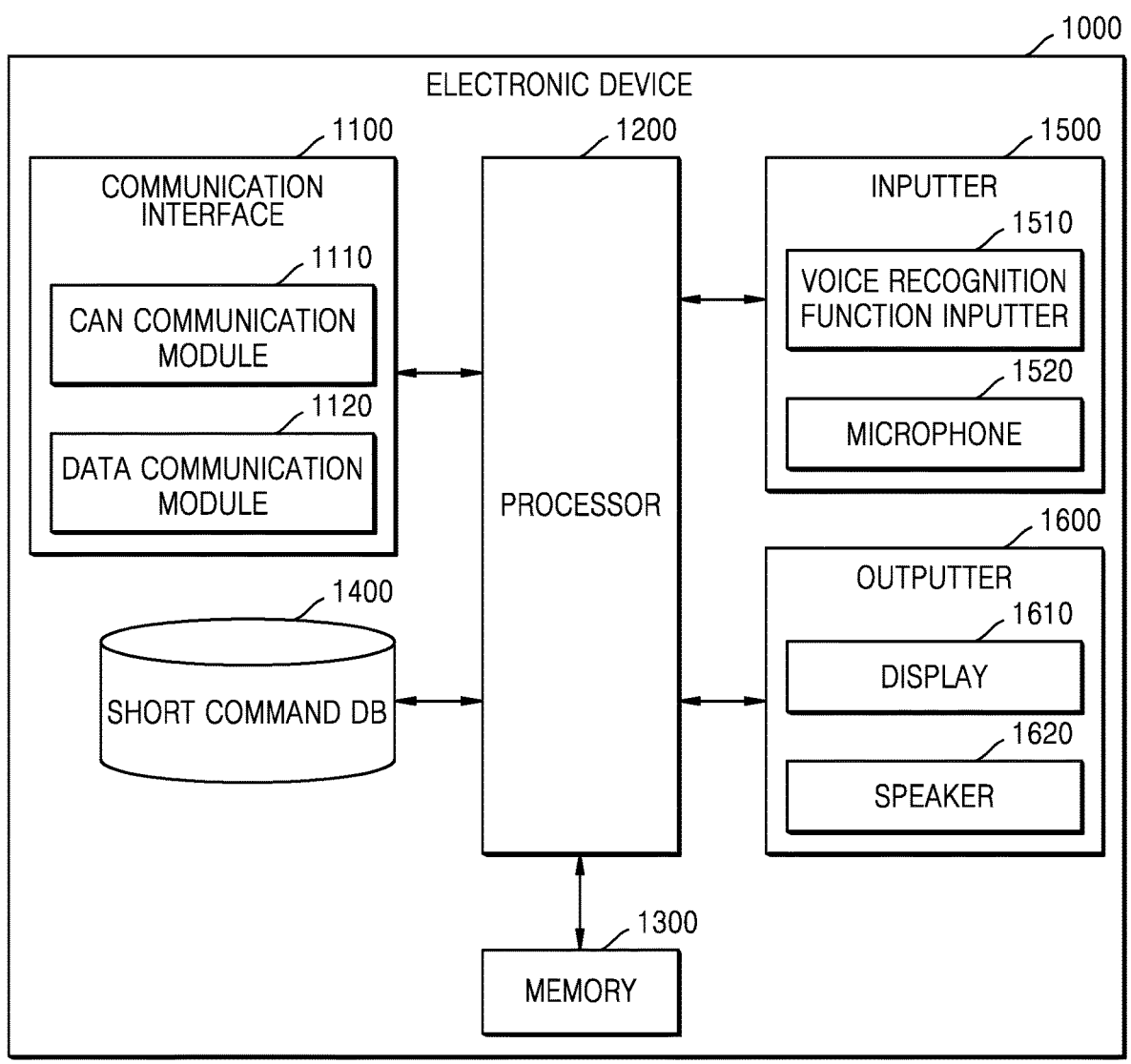
FIG. 2 is a block diagram of an electronic device according to an embodiment of the disclosure.

FIG. 2 is a block diagram of the electronic device 1000 according to an embodiment of the disclosure.

Referring to FIG. 2, the electronic device 1000 may include a communication interface 1100, a processor 1200, a memory 1300, a short command database (DB) 1400, an inputter 1500 (e.g., input circuitry), and an outputter 1600 (e.g., output circuitry). The communication interface 1100, the processor 1200, the memory 1300, the short command DB 1400, the inputter 1500, and the outputter 1600 may be electrically and/or physically connected to each other.

The elements illustrated in FIG. 2 are merely examples according to an embodiment of the disclosure, and elements included in the electronic device 1000 are not limited to those illustrated in FIG. 2. The electronic device 1000 may not include some of the elements illustrated in FIG. 2, or may further include elements not illustrated in FIG. 2. For example, the electronic device 1000 may further include a global positioning system (GPS) sensor for obtaining information about a current location of the vehicle, or an infrared sensor for detecting a location of an occupant.

The communication interface 1100 is configured to perform data communication with a vehicle sensor module 200 (see FIG. 3), a server, or an external device. The communication interface 1100 may include a controller area network (CAN) communication module 1110 and a data communication module 1120.

The CAN communication module 1110 may perform CAN communication with the vehicle sensor module 200 mounted in the vehicle. The CAN communication module 1110 may receive, through CAN communication from the vehicle sensor module 200, vehicle driving information including at least one of a current location, a driving road, or a driving speed of the vehicle. In an embodiment of the disclosure, the CAN communication module 1110 may receive occupant information related to each of a driver, a front passenger, and rear passengers in the vehicle from a seat sensor 230 (see FIG. 3) of the vehicle. In an embodiment of the disclosure, the CAN communication module 1110 may receive distance information between the occupant and the display 1610 based on a seat location of the occupant from an infrared sensor 240 (see FIG. 3) of the vehicle. The CAN communication module 1110 may provide the received vehicle driving information, occupant information, and distance information between the occupant and the display 1610 to the processor 1200.

The vehicle sensor module 200 will be described in detail below with reference to FIG. 3.

The data communication module 1120 is configured to perform data communication with the server or the external device outside the vehicle. The data communication module 1120 may perform data transmission and reception by using, for example, not only short-range wireless communication such as wireless local area network (WLAN) (or Wi-Fi), wireless broadband (WiBro), worldwide interoperability for microwave access (WiMAX), or Bluetooth but also a mobile communication network such as code-division multiple access (CDMA), wideband CDMA (WCDMA), 3rd generation (3G), 4th generation (4G), and/or 5th generation (5G) millimeter wave (mmWave). In an embodiment of the disclosure, the data communication module 1120 may receive traffic information, road information, (e.g., school zones, expressways, public roads, and local national roads), or safe speed information from the server. In another embodiment of the disclosure, the data communication module 1120 may receive, from the server, data utilized to execute or update applications.

The processor 1200 may execute one or more instructions of a program stored in the memory 1300. The processor 1200 may include a hardware element for performing arithmetic, logic, and input/output calculation and signal processing. The processor 1200 may include at least one of, for example, a central processing unit (CPU), a microprocessor, a graphics processing unit (GPU), an application processor (AP), an application-specific integrated circuit (ASIC), a digital signal processor (DSP), a digital signal processing device (DSPD), a programmable logic device (PLD), or a field-programmable gate array (FPGA), but is not limited thereto. In an embodiment of the disclosure, the processor 1200 may include a dedicated hardware chip for performing leaning based on artificial intelligence (AI).

The processor 1200 may include one or more hardware elements.

The memory 1300 may include, for example, non-volatile memory including at least one of flash memory, a hard disk, a multimedia card micro, a memory card (e.g., a secure digital (SD) or extreme digital (XD) memory card), read-only memory (ROM), read-only memory (ROM), electrically erasable programmable ROM (EEPROM), or programmable ROM (PROM), and volatile memory such as random access memory (RAM) or static RAM (SRAM).

The memory 1300 may store instructions, data structures, and program codes readable by the processor 1200. In the following embodiments of the disclosure, the processor 1200 may be implemented by executing the instructions of the program or the program codes stored in the memory 1300.

The processor 1200 may obtain at least one of the vehicle driving information and the occupant information by using the CAN communication module 1110. In an embodiment of the disclosure, the processor 1200 may obtain the vehicle driving information including at least one of the current location, the driving road, or the driving speed of the vehicle. In an embodiment of the disclosure, the processor 1200 may obtain the occupant information related to each of the driver, the front passenger, and the rear passengers in the vehicle from the CAN communication module 1110. In an embodiment of the disclosure, the processor 1200 may obtain the occupant information based on user identification information input by the occupant in a process of logging in to the electronic device 1000.

The processor 1200 may obtain display output information including information about the function UIs 111, 112, 113, and 114 (see FIG. 1) displayed on the display 1610.

The processor 1200 may generate one or more short commands by shortening voice commands for executing one or more functions provided by the vehicle or the electronic device 1000, based on at least one of the obtained vehicle driving information, occupant information, or display output information. Herein, the 'short command' refers to a shortened command generated by extracting a keyword(s) of a voice command received from the occupant to execute a function and/or an operation of the vehicle or the electronic device. The short command may include one or more short commands corresponding to one or more functions provided by the vehicle or applications of the electronic device 1000. In an embodiment of the disclosure, the processor 1200 may generate the short commands by shortening voice commands to include keywords utilized to execute functions. For example, when a voice command for determining a route to a destination in a navigation application is "Navigate to destination", the processor 1200 may generate the short command as 'Destination' corresponding to a keyword of the voice command for executing the function. As another example, when a voice command for playing a next song in a music application is "Play next song", the processor 1200 may generate the short command as 'Next song' corresponding to keywords of the voice command for executing the function.

The processor 1200 may detect functions represented by function UIs based on the display output information, and generate the one or more short commands corresponding to the function UIs by converting the detected functions into a natural language. In an embodiment of the disclosure, the processor 1200 may identify functions of one or more function-related GUIs displayed on the display 1610. For example, the processor 1200 may obtain function information related to the GUIs by finding resource names of a UI framework in a platform layer of software configuring the applications, and generate the one or more short commands by converting the obtained function information into a natural language. As another example, the processor 1200 may obtain function information corresponding to the GUIs by analyzing an application programming interface (API) of the applications, and generate the one or more short commands by converting the function information into a natural language. In an embodiment of the disclosure, the processor 1200 may detect widgets or icons included in launch screens of the applications, and generate the one or more short commands related to the detected widgets or icons.

However, the processor 1200 is not limited thereto, and may identify, through image processing, function information represented by the GUIs including icons or widgets displayed on the display 1610, and generate the one or more short commands by converting the identified function information into a natural language.

The processor 1200 may generate the short commands by shortening commands for executing applications frequently used by the occupant or functions of the applications. In an embodiment of the disclosure, the processor 1200 may obtain usage history information of the occupant based on user identification information of the occupant obtained in a log-in process, and obtain information about the applications frequently used by the occupant, based on the user identification information and the usage history information of the occupant. The processor 1200 may generate the one or more short commands by extracting keywords from commands for executing the functions of the applications frequently used by the occupant. The embodiment of the disclosure in which the processor 1200 generates the one or more short commands related to the frequently used applications based on the usage history information of the occupant will be described in detail below with reference to FIG. 6.

However, the short commands are not limited thereto, and may be preset for the functions of the applications or be determined based on inputs received from a user.

The one or more short commands may be stored in the short command DB 1400. In an embodiment of the disclosure, the processor 1200 may store the one or more short commands in the form of a list in the short command DB 1400 together with information about one or more related functions or applications.

The processor 1200 may display, on the display 1610, one or more voice command guidance UIs visually representing the one or more short commands. The 'voice command guidance UIs' are UIs for displaying, as text, numbers, or symbols, voice commands for inducing utterance of an occupant to execute functions provided by the vehicle or applications of the electronic device 1000. In an embodiment of the disclosure, the voice command guidance UIs may be GUIs. The voice command guidance UI may include one or more voice command guidance UIs.

The processor 1200 may display the one or more voice command guidance UIs on an area correspondingly adjacent to a location of one or more function UIs. In an embodiment of the disclosure, the processor 1200 may provide and display one or more related voice command guidance UIs at a location spaced apart by a preset distance from a location where the one or more function UIs are displayed. For example, a first voice command guidance UI including text such as 'Music' may be displayed at a location spaced apart by a preset distance from a location where a first UI for executing a music application is displayed. In addition, a second voice command guidance UI including text such as 'Previous song' may be displayed at a location spaced apart by a preset distance from a second UI provided as a button-type GUI for playing a previous song. The embodiment of the disclosure in which the processor 1200 displays the one or more voice command guidance UIs will be described in detail below with reference to FIG. 5.

The processor 1200 may assign weights to the one or more voice command guidance UIs, and determine at least one of the number, location, or size of the voice command guidance UIs to be displayed, based on the weights. In an embodiment of the disclosure, the processor 1200 may determine the weights of the one or more voice command guidance UIs based on at least one of the vehicle driving information, the occupant information, the display output information, or the safe speed.

Herein, the 'safe speed' may be determined based on the vehicle driving information. In an embodiment of the disclosure, the processor 1200 may obtain information about at least one of a current location, a driving road, or a driving speed of the vehicle based on the vehicle driving information, and determine the safe speed based on the obtained information. In an embodiment of the disclosure, the safe speed may be determined based on a speed limit determined based on information about characteristics of the driving road, e.g., a school zone, an expressway, or a local road. The safe speed may be less than the speed limit by a preset value. For example, the safe speed may be determined to be 25 km/h when the speed limit in a school zone is 30 km/h, or be determined to be 100 km/h when the speed limit on an expressway is 110 km/h. However, the safe speed is not limited thereto, and may be equal to the speed limit which is preset based on the road.

The processor 1200 may compare the driving speed of the vehicle to the safe speed, and differently determine the weights of the one or more voice command guidance UIs depending on the comparison result. In an embodiment of the disclosure, when the driving speed is greater than the safe speed, the processor 1200 may determine that the driver needs to pay attention to driving for safety, and adjust a weight of one or more voice command guidance UIs for executing functions related to driving, to a high value, and adjust a weight of one or more voice command guidance UIs for executing convenience functions other than driving, e.g., functions related to music playback, to a low value.

In an embodiment of the disclosure, the processor 1200 may set a high weight for voice command guidance UIs related to functions of frequently used applications compared to other voice command guidance UIs, based on the usage history information of the occupant.

In an embodiment of the disclosure, the processor 1200 may set a high weight for voice command guidance UIs related to applications executed using icons or widgets displayed on the display 1610 compared to a weight of voice command guidance UIs related to other non-displayed applications.

In an embodiment of the disclosure, the processor 1200 may display one or more voice command guidance UIs having a weight greater than a preset threshold. In another embodiment of the disclosure, the processor 1200 may display one or more voice command guidance UIs having a high weight, in a larger size compared to one or more voice command guidance UIs having a low weight. The embodiment of the disclosure in which the processor 1200 adjusts the weights of the one or more voice command guidance UIs by comparing the driving speed of the vehicle to the safe speed, and displays the one or more voice command guidance UIs based on the adjusted weights will be described in detail below with reference to FIGS. 8 to 10.

The processor 1200 may display the one or more voice command guidance UIs when the vehicle is driving, and may not display the one or more voice command guidance UIs when the vehicle is stopped or parked. In an embodiment of the disclosure, the processor 1200 may obtain speed information of the vehicle from a speed sensor 220 (see FIG. 3) of the vehicle sensor module 200 (see FIG. 3), determine that the vehicle is stopped or parked, when the speed of the vehicle is 0 km/h or less than a preset threshold speed (e.g., 5 km/h), and not display the one or more voice command guidance UIs based on the determination result. However, the processor 1200 is not limited thereto, and may display the one or more voice command guidance UIs regardless of the speed of the vehicle.

When an event, e.g., an error of an application, a timing to update the application, or an accident nearby, occurs, an alert message may be displayed on the display 1610. The alert message may be displayed in the form of a pop-up message overlaid on the function UIs or the one or more voice command guidance UIs. In this case, the occupant may not see the function UIs and the one or more voice command guidance UIs displayed on the display 1610. The processor 1200 may increase a weight of a voice command guidance UI related to a function for removing the pop-up message from the display 1610. In an embodiment of the disclosure, the processor 1200 may set the highest weight for the voice command guidance UI for executing the function for removing the pop-up message compared to the other voice command guidance UIs. The embodiment of the disclosure in which the processor 1200 sets the weight of the voice command guidance UI for removing the pop-up message will be described in detail below with reference to FIG. 11.

The processor 1200 may determine an area for displaying the one or more voice command guidance UIs on the display 1610, based on a distance between a location of the occupant and the display 1610. In an embodiment of the disclosure, the processor 1200 may obtain location information of the occupant from the CAN communication module 1110 or by using an infrared sensor included in the electronic device 1000. The processor 1200 may measure the distance between the occupant and the display 1610 by using the location information of the occupant. In an embodiment of the disclosure, the display 1610 may be divided into a plurality of areas, and the processor 1200 may display the one or more voice command guidance UIs on an area far from the occupant from among the plurality of areas. The embodiment of the disclosure in which the processor 1200 displays the one or more voice command guidance UIs on a partial area of the display 1610 based on the distance between the occupant and the display 1610 will be described in detail below with reference to FIG. 12.

The processor 1200 may receive a voice input uttered by the occupant through a microphone 1520, and identify a voice command guidance UI matching the voice input by comparing the received voice input to the displayed one or more voice command guidance UIs. The processor 1200 may identify a short command corresponding to the identified voice command guidance UI, and control related devices to execute a function corresponding to the short command. In an embodiment of the disclosure, when a voice command guidance UI matching the voice input is not identified, the processor 1200 may transmit data about the voice input to the server. The embodiment of the disclosure in which the processor 1200 performs a voice recognition function will be described in detail below with reference to FIG. 14.

The short command DB 1400 is a storage storing the one or more short commands. The short command DB 1400 may include non-volatile memory. The non-volatile memory refers to a storage medium capable of retaining stored information without power supply and of making the information usable again when power is supplied. The non-volatile memory may include at least one of, for example, flash memory, a hard disk, a solid-state drive (SSD), a multimedia card micro, magnetic memory, a magnetic disk, or an optical disc.

The short command DB 1400 is included in the electronic device 1000 in FIG. 2, but is not limited thereto. In an embodiment of the disclosure, the short command DB 1400 may be implemented as external memory not included in the electronic device 1000 (e.g., an SD or XD memory card) or a web-based storage medium connected through the data communication module 1120 in a wired or wireless manner.

The inputter 1500 is configured to receive an input from the occupant in the vehicle (i.e., at least one occupant from among a driver, a front passenger, and rear passengers). The inputter 1500 may include a voice recognition function inputter 1510 and the microphone 1520.

The voice recognition function inputter 1510 is configured to receive a user input for executing a voice recognition function. In an embodiment of the disclosure, the voice recognition function inputter 1510 may be a hardware button and be provided on a steering wheel or a dashboard of the vehicle. However, the voice recognition function inputter 1510 is not limited thereto, and may be a GUI displayed on the display 1610.

Depending on an embodiment of the disclosure, the voice recognition function inputter 1510 may not be included in the electronic device 1000. In this case, the voice recognition function may be executed based on wake-up voice received through the microphone 1520. The wake-up voice may be a voice command for waking up the electronic device 1000 to perform the voice recognition function, and include, for example, 'Hi Bixby' or 'OK Google'.

The microphone 1520 may receive a voice input uttered by the occupant. In an embodiment of the disclosure, the microphone 1520 may convert the received voice input into an audio signal, and obtain a voice signal by removing noise (e.g., non-voice components) from the audio signal. The microphone 1520 may provide the voice signal to the processor 1200.

The outputter 1600 may include the display 1610 and a speaker 1620.

The display 1610 may display launch screens of applications, function UIs, and voice command guidance UIs. The display 1610 may be a OD, but is not limited thereto. The display 1610 may include any of, for example, a navigation device, a dashboard display, a HUD, and a passenger display.

The display 1610 may include a screen configured as at least one of, for example, a liquid crystal display, a thin film transistor-liquid crystal display, an organic light-emitting diode display, a flexible display, a three-dimensional (3D) display, or an electrophoretic display.

In an embodiment of the disclosure, the display 1610 may include a plurality of displays. In this case, the plurality of displays may be positioned corresponding to a plurality of seats included in the vehicle. In an embodiment of the disclosure, the processor 1200 may display the one or more voice command guidance UIs on a display where a voice recognition function is activated by the occupant from among the plurality of displays. The embodiment of the disclosure in which the processor 1200 displays the voice command guidance UIs on a specific display from among the plurality of displays 1610 will be described in detail below with reference to FIG. 7.

The speaker 1620 may output an audio signal. The speaker 1620 may output a notification message related to performance of a function under the control of the processor 1200. However, the speaker 1620 is not limited thereto, and output an audio signal including at least one of sound effects, ringtones, melodies, music, or songs.

Figure 3:
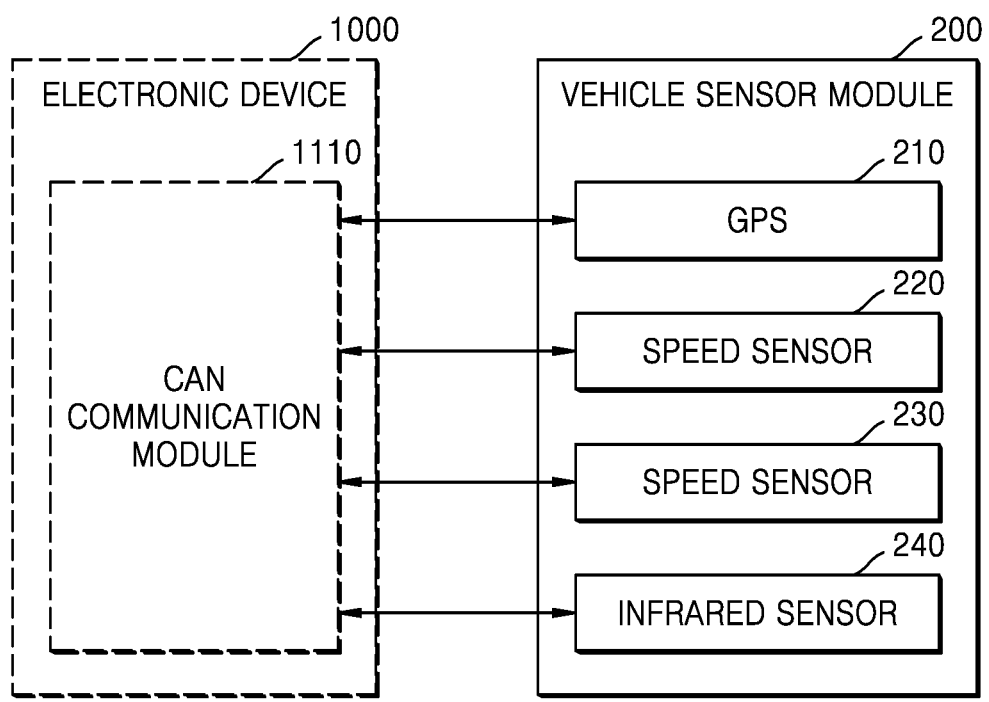
FIG. 3 is a block diagram of an electronic device and a vehicle sensor module, according to an embodiment of the disclosure.

FIG. 3 is a block diagram of the electronic device 1000 and the vehicle sensor module 200, according to an embodiment of the disclosure.

The vehicle sensor module 200 may be mounted in the vehicle, and monitor a location, a speed, and an occupant of the vehicle and provide vehicle driving information and occupant information to the electronic device 1000. The vehicle sensor module 200 may transmit the vehicle driving information and the occupant information through the CAN communication module 1110 to the electronic device 1000. The vehicle sensor module 200 may perform CAN communication with the electronic device 1000.

Referring to FIG. 3, the vehicle sensor module 200 may include a GPS module 210, the speed sensor 220, the seat sensor 230, and the infrared sensor 240. The vehicle sensor module 200 is separate from the electronic device 1000. However, the vehicle sensor module 200 is not limited thereto, and at least one element included in the vehicle sensor module 200 may be included in the electronic device 1000. For example, the GPS module 210 or the infrared sensor 240 included in the vehicle sensor module 200 may be included in the electronic device 1000.

The GPS module 210 is configured to receive a GPS signal and obtain information about a current location of the vehicle based on the obtained GPS signal. In an embodiment of the disclosure, the GPS module 210 may obtain location information of the vehicle by receiving a navigation message from at least one GPS satellite located in the atmosphere of the Earth. Specifically, the GPS module 210 may obtain current location coordinates of the vehicle by measuring delay of radio waves emitted from the GPS satellite. In an embodiment of the disclosure, the GPS module 210 may obtain current driving road information of the vehicle.

The processor 1200 may obtain current location information of the vehicle through the CAN communication module 1110 from the GPS module 210.

The speed sensor 220 may detect a driving speed of the vehicle and transmit driving speed information to the electronic device 1000.

The seat sensor 230 may be provided in a seat cushion of the vehicle, and determine whether a seat is occupied, by measuring a pressure applied to the seat cushion. The seat sensor 230 may include, for example, a pressure sensor. In an embodiment of the disclosure, when the pressure applied to the seat cushion is greater than a preset threshold pressure, the seat sensor 230 may determine that the seat is occupied. Otherwise, when the pressure applied to the seat cushion is less than or equal to the preset threshold pressure, the seat sensor 230 may determine that the seat is not occupied. The seat sensor 230 may provide, to the processor 1200, information about the result of determining whether the seat is occupied. The processor 1200 may obtain information about whether any one of a driver's seat, a passenger seat, and rear seats is occupied, based on the occupant information received from the seat sensor 230.

The infrared sensor 240 may detect a location of an occupant by receiving an infrared signal reflected from the occupant. The infrared sensor 240 may provide information about an intensity, a transmission angle, and a transmission location of the infrared signal to the processor 1200. The processor 1200 may obtain location information of the occupant based on the information obtained from the infrared sensor 240.

Figure 4:
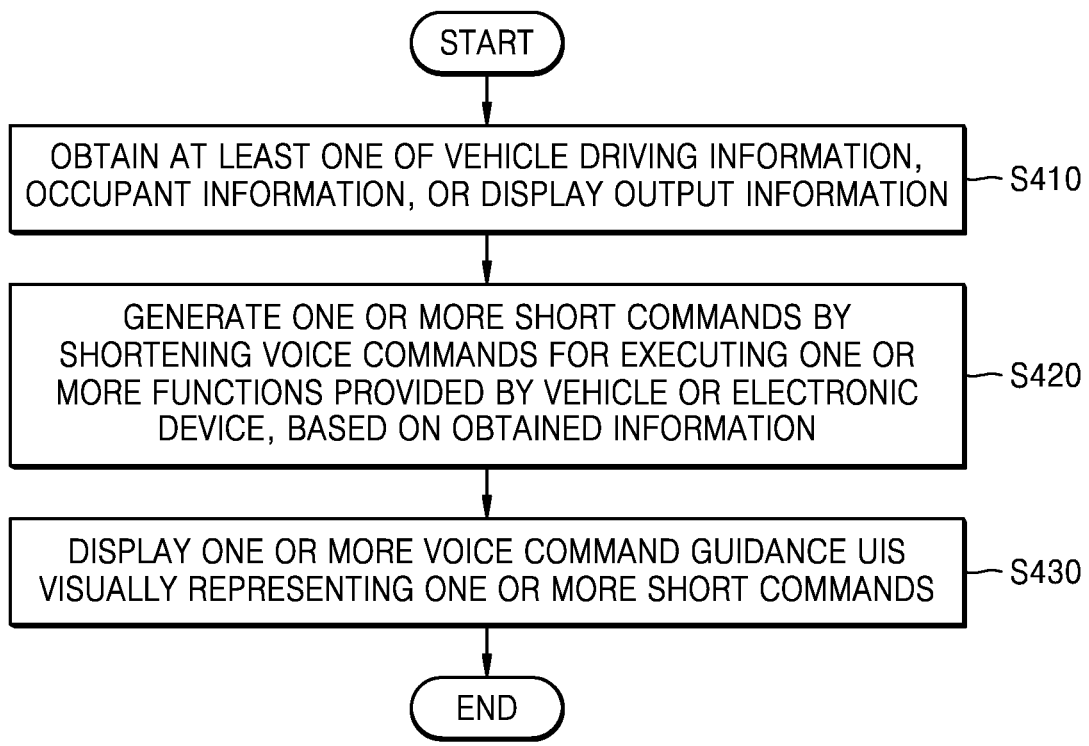
FIG. 4 is a flowchart of a method of operating an electronic device, according to an embodiment of the disclosure.

FIG. 4 is a flowchart of a method for operating the electronic device 1000, according to an embodiment of the disclosure.

In operation S410, the electronic device 1000 may obtain at least one of vehicle driving information, occupant information, or display output information. In an embodiment of the disclosure, the electronic device 1000 may obtain information pertaining to operation and travel of the vehicle from the vehicle sensor module 200 (see FIG. 3), such as current location information, driving road information, speed information of the vehicle, and information indicating whether each seat is occupied by a passenger. In an embodiment of the disclosure, the electronic device 1000 may further receive traffic information, road information, (e.g., school zones, expressways, public roads, and local national roads), or safe speed information from a server.

The electronic device 1000 may obtain information display outputs, which may include information on launch screens of applications and function UIs displayed on the display 1610 (see FIG. 2). In an embodiment of the disclosure, the electronic device 1000 may identify functions of one or more function-related GUIs displayed on the display 1610. For example, the electronic device 1000 may obtain function information related to the GUIs by finding resource names of a UI framework in a platform layer of software configuring the applications. In another embodiment of the disclosure, the electronic device 1000 may obtain function information corresponding to the GUIs by analyzing an API of the applications.

In operation S420, the electronic device 1000 may generate one or more short commands by shortening voice commands for executing the one or more functions provided by the vehicle or the electronic device 1000, based on the obtained information. In an embodiment of the disclosure, the electronic device 1000 may generate the short commands by shortening voice commands to include keywords utilized to execute functions.

In an embodiment of the disclosure, the electronic device 1000 may detect functions represented by function UIs based on the display output information, and generate the one or more short commands corresponding to the function UIs by converting the functions into a natural language.

In an embodiment of the disclosure, the electronic device 1000 may generate the short commands by shortening commands for executing frequently-used applications by an occupant or functions of the applications. In an embodiment of the disclosure, the electronic device 1000 may obtain usage history information of the occupant based on user identification information of the occupant obtained in a log-in process, and obtain information about the applications frequently used by the occupant, based on the user identification information and the usage history information of the occupant. The electronic device 1000 may generate the one or more short commands by extracting keywords from commands for executing the functions of the applications frequently used by the occupant.

In an embodiment of the disclosure, the electronic device 1000 may store the generated one or more short commands in the form of a list in the short command DB 1400.

In operation S430, the electronic device 1000 may display one or more voice command guidance UIs visually representing the one or more short commands. The voice command guidance UIs' are UIs for displaying, as text, numbers, or symbols, voice commands for inducing utterance of an occupant to execute functions provided by the vehicle or applications of the electronic device 1000. In an embodiment of the disclosure, the voice command guidance UIs may be GUIs.

The electronic device 1000 may display the one or more voice command guidance UIs on a display area correspondingly adjacent to a location of one or more function UIs.

The electronic device 1000 may assign weights to the one or more voice command guidance UIs, and determine at least one of whether to display the voice command guidance UIs, a display location, or a display size thereof, based on the weights. In an embodiment of the disclosure, the electronic device 1000 may determine the weights of the one or more voice command guidance UIs based on at least one of the vehicle driving information, the occupant information, the display output information, or the safe speed.

The electronic device 1000 may compare the driving speed of the vehicle to the safe speed, and differently determine the weights of the one or more voice command guidance UIs depending on the comparison result. In an embodiment of the disclosure, when the driving speed is greater than the safe speed, the electronic device 1000 may determine that a driver needs to pay attention to driving for safety, and adjust a weight of one or more voice command guidance UIs for executing functions related to driving, to a high value, and adjust a weight of one or more voice command guidance UIs for executing convenience functions other than driving, e.g., functions related to music playback, to a low value.

In an embodiment of the disclosure, the electronic device 1000 may display one or more voice command guidance UIs having a weight greater than a preset threshold. In another embodiment of the disclosure, the electronic device 1000 may display one or more voice command guidance UIs having a high weight in a larger size compared to a size of one or more voice command guidance UIs having a low weight.

Figure 5:
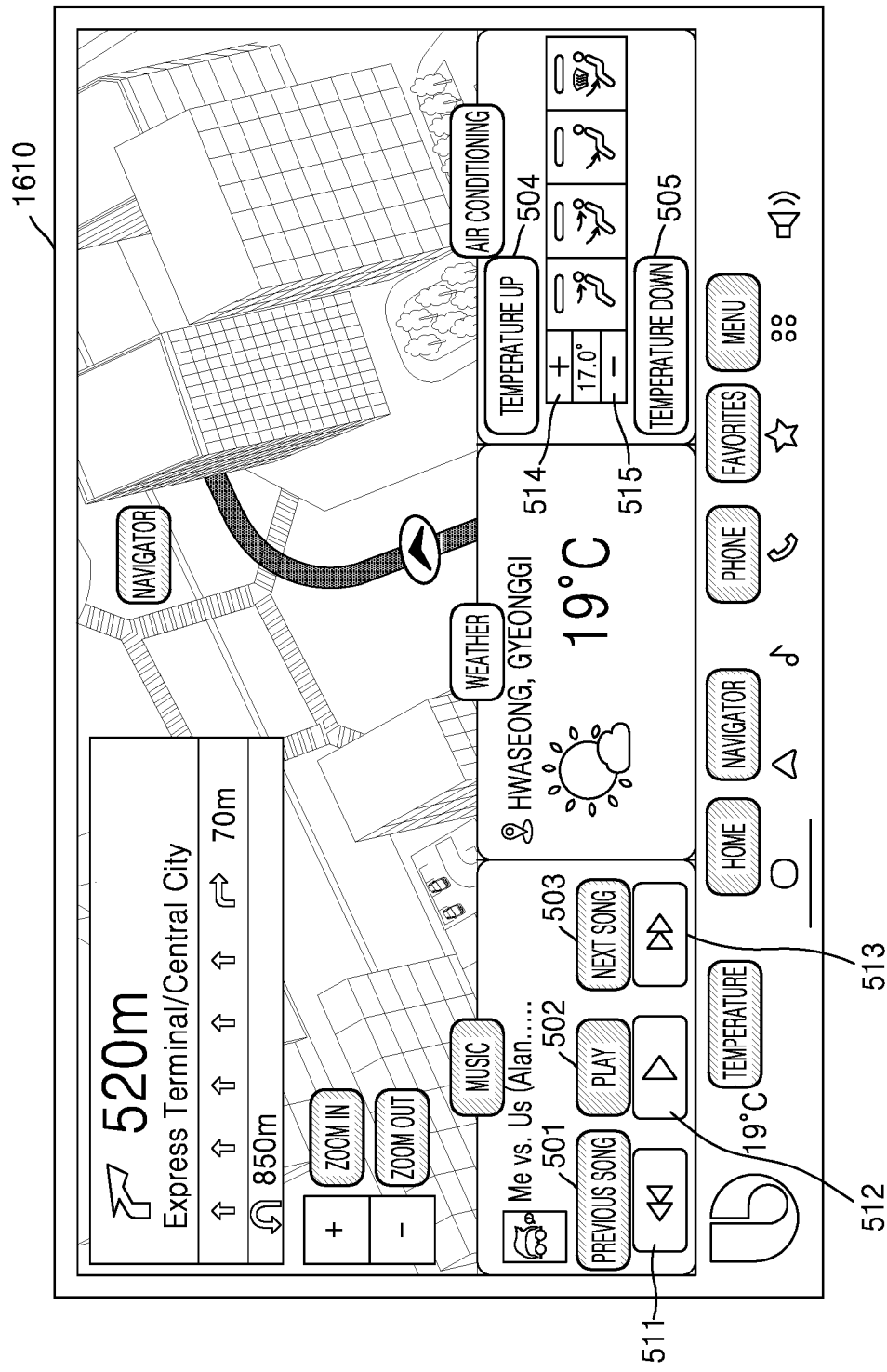
FIG. 5 is a diagram showing an electronic device displaying voice command guidance UIs, according to an embodiment of the disclosure.

FIG. 5 is a diagram showing the electronic device 1000 displaying voice command guidance UIs 501, 502, 503, 504, and 505, according to an embodiment of the disclosure.

Referring to FIG. 5, the electronic device 1000 may display, on the display 1610, the voice command guidance UIs 501, 502, 503, 504, and 505 for inducing utterance of voice commands for executing functions of applications, and launch screens and function UIs 511, 512, 513, 514, and 515 representing the functions of the applications. In the embodiment of the disclosure shown in FIG. 5, the voice command guidance UIs 501, 502, 503, 504, and 505 and the function UIs 511, 512, 513, 514, and 515 include a plurality of UIs, but are not limited thereto. A single voice command guidance UI 501, 502, 503, 504, or 505 and a single function UI 511, 512, 513, 514, or 515 may be displayed on the display 1610.

The electronic device 1000 may generate short commands based on output information displayed on the display 1610. In an embodiment of the disclosure, the electronic device 1000 may detect functions represented by the plurality of displayed function UIs 511, 512, 513, 514, and 515, and generate a plurality of short commands corresponding to the displayed plurality of function UIs 511, 512, 513, 514, and 515 by converting the detected functions into natural language (e.g., based on the function UI names). In an embodiment of the disclosure, the processor 1200 (see FIG. 2) of the electronic device 1000 may obtain function information related to the plurality of function UIs 511, 512, 513, 514, and 515 by retrieving resource names for the UI framework in a platform layer of software configuring the applications, and generate the plurality of short commands by converting the obtained function information (e.g., the command names) into natural language format. In another embodiment of the disclosure, the processor 1200 may obtain function information corresponding to the plurality of function UIs 511, 512, 513, 514, and 515 by analyzing an API of the applications, and generate the plurality of short commands by converting the function information into a natural language.

However, the processor 1200 is not limited thereto, and may identify, through image processing, information for each of the functions represented by the plurality of function UIs 511, 512, 513, 514, and 515 including icons or widgets displayed on the display 1610, and generate the plurality of short commands by converting the identified function information into a natural language format.

In the embodiment of the disclosure shown in FIG. 5, the processor 1200 may detect that function information related to the first function UI 511 is 'Play previous song', and generate a short command such as 'Previous song' by converting the function information into a natural language format. As another example, the processor 1200 may detect that function information related to the fourth UI 514 displayed as a symbol such as '+' is 'Turn up set temperature of air conditioner', and generate a short command such as 'Temperature up' by converting the function information into a natural language and extracting keywords representing the function.

However, the short commands are not limited thereto, and may be preset for the plurality of function UIs 511, 512, 513, 514, and 515 or be determined based on inputs received from a user.

The electronic device 1000 may display a plurality of voice command guidance UIs 501, 502, 503, 504, and 505 for visually representing the plurality of generated short commands by using text, numbers, or symbols. In an embodiment of the disclosure, the electronic device 1000 may display the plurality of voice command guidance UIs 501, 502, 503, 504, and 505 on an area correspondingly adjacent to a location where the plurality of function UIs 511, 512, 513, 514, and 515 are displayed. For example, in a music application, the first voice command guidance UI 501 including text representing a short command such as 'Previous song' may be displayed at a location adjacent to a location where the first function UI 511 for executing a function for playing a previous song is displayed. Likewise, in the music application, the second voice command guidance UI 502 such as 'Play' may be displayed at a location adjacent to a location where the second function UI 512 for executing a play (or pause) function is displayed, and the third voice command guidance UI 503 such as 'Next song' may be displayed at a location adjacent to a location where the third function UI 513 for executing a function for playing a next song of a currently playing song is displayed. Likewise, in an air conditioning application, the fourth voice command guidance UI 504 including text such as 'Temperature up' may be displayed at a location adjacent to a location where the fourth function UI 514 for executing a function for turning up the set temperature of the air conditioner is displayed, and the fifth voice command guidance UI 505 including text such as 'Temperature down' may be displayed at a location adjacent to a location where the fifth function UI 515 for executing a function for turning down the set temperature of the air conditioner is displayed.

In the embodiment of the disclosure shown in FIG. 5, because the electronic device 1000 displays the plurality of function UIs 511, 512, 513, 514, and 515 for executing functions provided by applications, and displays the plurality of voice command guidance UIs 501, 502, 503, 504, and 505 at a location correspondingly adjacent to a location where the plurality of function UIs 511, 512, 513, 514, and 515 are displayed, an occupant may intuitively understand a voice command related to a function desired to be executed, and user convenience may be increased. In addition, because the electronic device 1000 according to an embodiment of the disclosure does not need additional parameter information and may merely receive an utterance corresponding to text displayed on the voice command guidance UI 501, 502, 503, 504, or 505 in order to execute a function by using a voice command, accuracy of voice recognition may be increased and distracted driving may be reduced.

Figure 6:
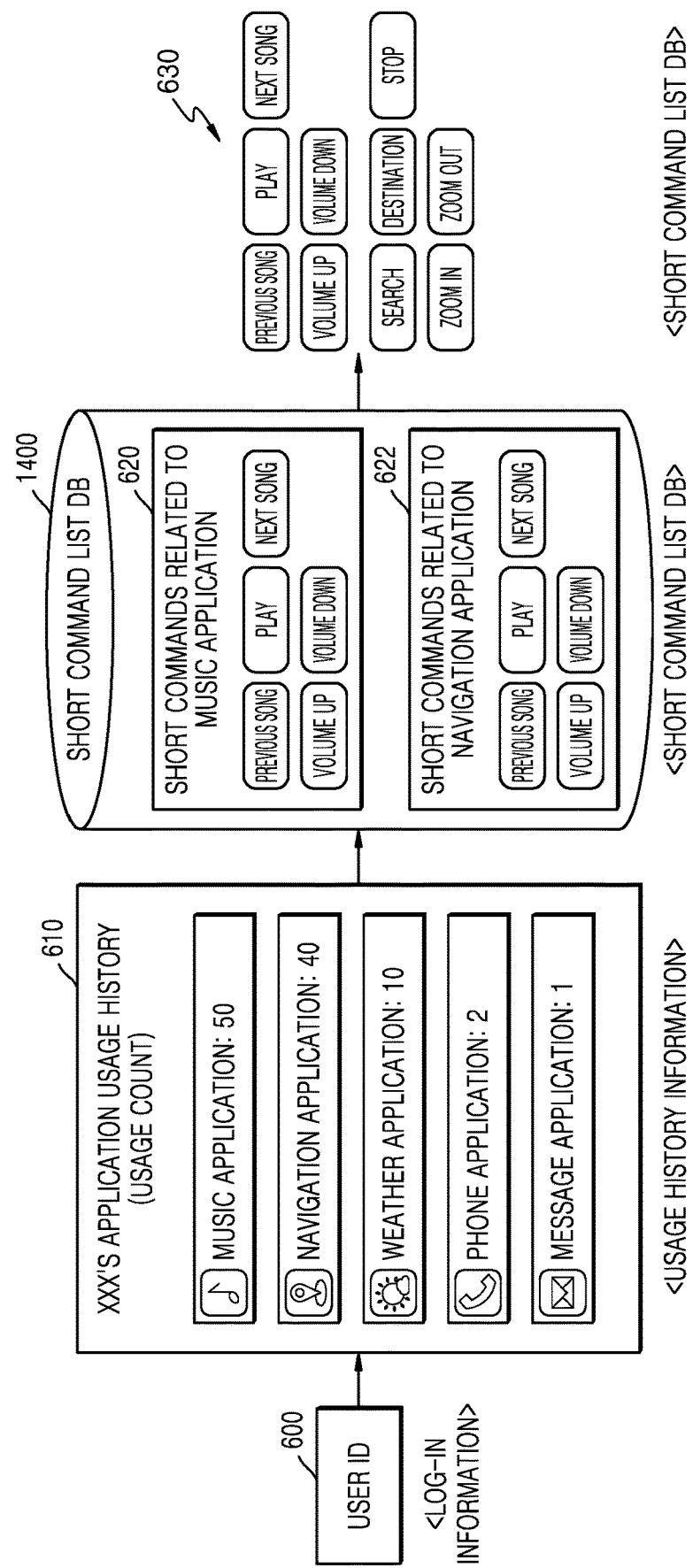
FIG. 6 is a diagram showing an electronic device generating short commands related to functions of frequently used applications based on user identification information, according to an embodiment of the disclosure.

FIG. 6 is a diagram showing the electronic device 1000 generating short commands related to functions of frequently used applications based on user identification information, according to an embodiment of the disclosure.

Referring to FIG. 6, the electronic device 1000 may obtain user identification information 600 of an occupant in a log-in process. In an embodiment of the disclosure, the user identification information 600 may include a user identity (ID) information of the occupant.

The electronic device 1000 may obtain application usage history information 610 based on the user identification information 600. The application usage history information 610 may store a count of a number of times that each application has been used by the occupant, who may be logged in with the user ID. The processor 1200 (see FIG. 2) of the electronic device 1000 may identify the applications most frequently used by the occupant, based on the application usage history information 610. Referring to the application usage history information 610 according to the embodiment of the disclosure shown in FIG. 6, it is shown that an occupant logged in with a user ID such as 'XXX' has used a music application 50 times, a navigation application 40 times, a weather application 10 times, a phone application 2 times, and a message application 1 time. Although not shown in FIG. 6, in an embodiment of the disclosure, the processor 1200 may obtain counts of the numbers of times that a plurality of functions provided by a plurality of applications have been used, based on the application usage history information 610.

The processor 1200 may generate short commands 620 and 622 by extracting keywords from commands for executing functions for the frequently-used applications (and exclude non-frequently-used applications). In an embodiment of the disclosure, the processor 1200 may identify at least one application which has been used more than a preset threshold number of times from among the plurality of applications. For example, when the preset threshold number of times is 30, the processor 1200 may identify the music application used 50 times and the navigation application used 40 times from among the plurality of applications included in the application usage history information 610. The processor 1200 may generate the short commands 620 and 622 related to functions executed by the identified at least one application. In the embodiment of the disclosure shown in FIG. 6, the processor 1200 may generate 'Previous song', 'Play', 'Next song', 'Volume up', and 'Volume down' as the short commands 620 related to the music application, and generate 'Search', 'Destination', 'Stop', 'Zoom in', and 'Zoom out' as the short commands 622 related to the navigation application.

The processor 1200 may generate voice command guidance UIs 630 including text, numbers, or symbols to visually represent the generated short commands. The processor 1200 may display the voice command guidance UIs 630.

When voice command guidance UIs related to all current executable functions are displayed on a display screen, the screen may become complicated and distracted driving may be caused due to a large number of voice command guidance UIs. In the embodiment of the disclosure shown in FIG. 6, because the electronic device 1000 displays the voice command guidance UIs 630 for frequently-used applications by a passenger (or a driver), as based on usage history information, the voice recognition UI are more limited in number, and specialized and customized for the passenger (or the driver). Thus, the resulting display menu may be less crowded, and distracted driving may be reduced.

Figure 7:
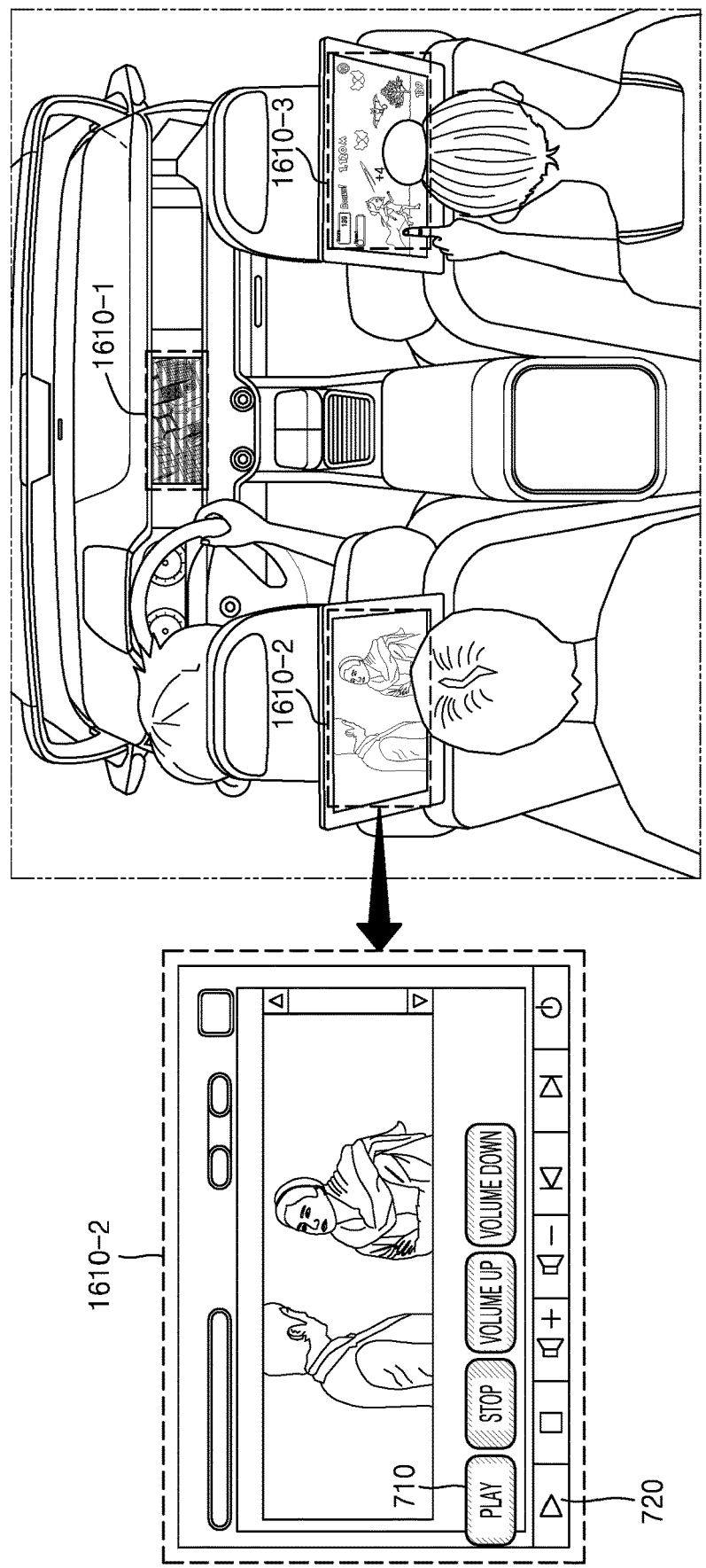
FIG. 7 is a diagram showing an electronic device displaying voice command guidance UIs on a display where a voice recognition function is activated by a user from among a plurality of displays, according to an embodiment of the disclosure.

FIG. 7 is a diagram showing the electronic device 1000 displaying voice command guidance UIs on a display where a voice recognition function is activated by a user from among a plurality of displays 1610-1, 1610-2, and 1610-3, according to an embodiment of the disclosure.

Referring to FIG. 7, the electronic device 1000 may include the plurality of displays 1610-1, 1610-2, and 1610-3. The plurality of displays 1610-1, 1610-2, and 1610-3 may be located to correspond to a plurality of seats included in the vehicle.

In the embodiment of the disclosure shown in FIG. 7, the first display 1610-1 may be a CID, the second display 1610-2 may be a display attached to a backrest of a driver's seat, and the third display 1610-3 may be a display attached to a backrest of a passenger seat. The second display 1610-2 may be assigned to be used by a left rear passenger, and the third display 1610-3 may be assigned to be used by a right rear passenger.

The electronic device 1000 may display the voice command guidance UIs on a display for which a user input for activating the voice recognition function is received, from among the plurality of displays 1610-1, 1610-2, and 1610-3 (and exclude display of the UIs on display screens that fail to correspond to the same). In an embodiment of the disclosure, the electronic device 1000 may receive a button input or GUI touch input for activating the voice recognition function, from at least one occupant from among a driver, a front passenger, and rear passengers. Upon receiving the button input or the touch input, the electronic device 1000 may activate the voice recognition function and display the voice command guidance UIs. However, the electronic device 1000 is not limited thereto. In another embodiment of the disclosure, the electronic device 1000 may receive wake-up voice for activating the voice recognition function, from at least one occupant from among the driver, the front passenger, and the rear passengers, and display the voice command guidance UIs upon receiving the wake-up voice. The wake-up voice may include, for example, 'Hi Bixby' or 'OK Google'.

In the embodiment of the disclosure shown in FIG. 7, the electronic device 1000 may receive a user input for activating the voice recognition function, from a left rear passenger from among a driver and two rear passengers, and display voice command guidance UIs 710 on the second display 1610-2. The voice command guidance UIs 710 may be UIs visually representing short commands for executing function UIs 720 representing functions of an application displayed on the second display 1610-2, and be displayed at a location correspondingly adjacent to the function UIs 720.

Although the electronic device 1000 displays the voice command guidance UIs on a display when the button input, touch input, or wake-up voice input for activating the voice recognition function is received from an occupant in the above description, the embodiment of the disclosure is not limited thereto. In an embodiment of the disclosure, the electronic device 1000 may determine whether each of a driver's seat, a passenger seat, and rear seats is occupied, and display the voice command guidance UIs on a display assigned for the occupied seat from among the plurality of displays 1610-1, 1610-2, and 1610-3. The electronic device 1000 may determine whether at least one of the driver's seat, the passenger seat, or the rear seats is occupied, based on measured pressures obtained from the seat sensor 230 (see FIG. 3) of the vehicle sensor module 200 (see FIG. 3), and display the voice command guidance UIs on a display assigned for the occupied seat. For example, when a measured pressure obtained from the seat sensor 230 is greater than a preset threshold for a right rear seat from among the driver's seat, the passenger seat, and the rear seats, the electronic device 1000 may display the voice command guidance UIs on the third display 1610-3 assigned for the right rear seat from among the plurality of displays 1610-1, 1610-2, and 1610-3.

Figure 8:
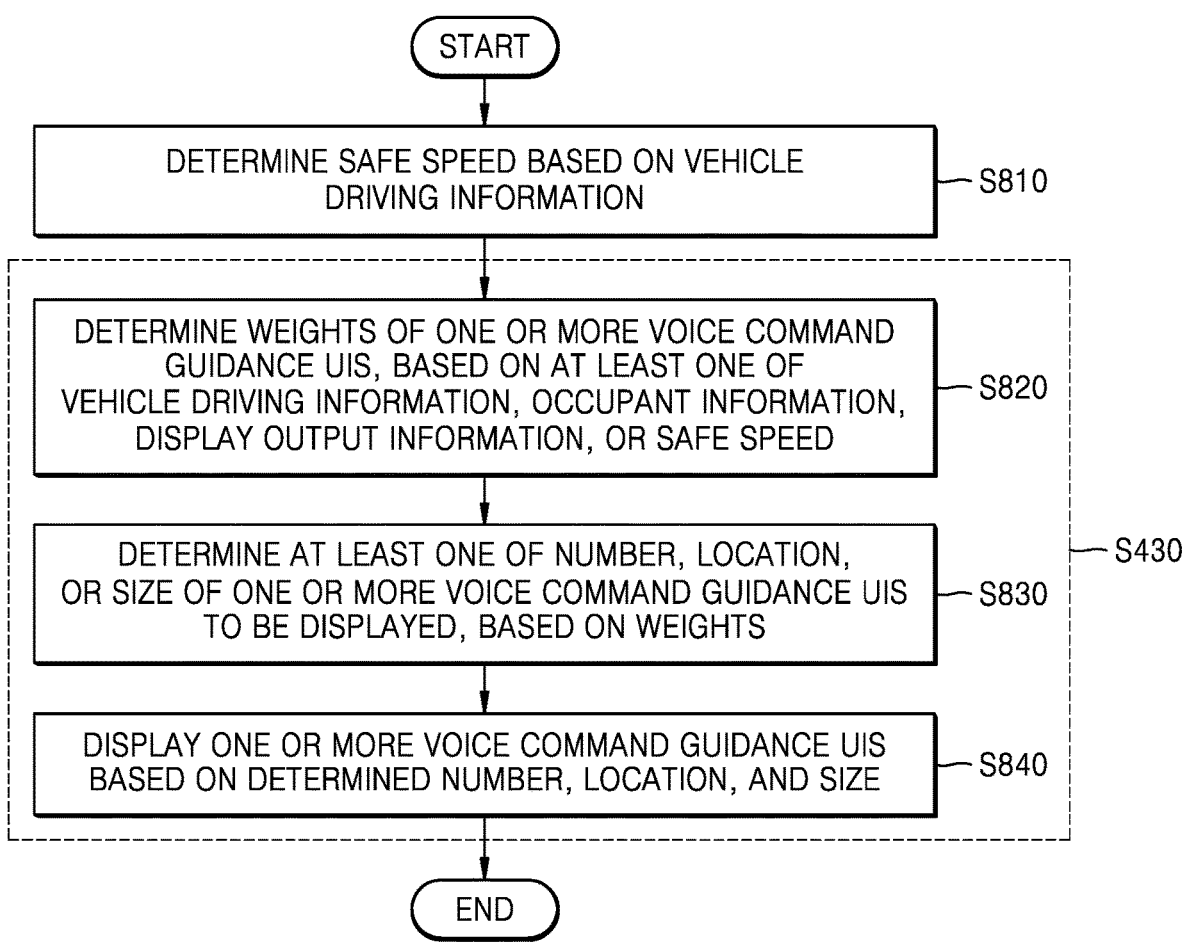
FIG. 8 is a flowchart of a method, performed by an electronic device, of displaying voice command guidance UIs, according to an embodiment of the disclosure.

FIG. 8 is a flowchart of a method, performed by the electronic device 1000, of displaying voice command guidance UIs, according to an embodiment of the disclosure.

Referring to FIG. 8, an example in which the electronic device 1000 assigns weights to the voice command guidance UIs, and displays the voice command guidance UIs by adjusting the number, location, and size of the voice command guidance UIs based on the weights is shown. Operations S820 to S840 shown in FIG. 8 are subdivided from operation S430 shown in FIG. 4.

In operation S810, the electronic device 1000 may determine a safe speed for vehicle travel, based on the vehicle driving information. In an embodiment of the disclosure, the electronic device 1000 may obtain vehicle driving information, such as a current location and a driving road of the vehicle from the GPS module 210 (see FIG. 3) of the vehicle sensor module 200 (see FIG. 3). The electronic device 1000 may further obtain information about characteristics of the current driving road of the vehicle, e.g., information about a school zone, an expressway, or a local road. In an embodiment of the disclosure, the electronic device 1000 may obtain information about a driving speed of the vehicle from the speed sensor 220 (see FIG. 3).

The electronic device 1000 may determine the safe speed based on the obtained information about the current location, the characteristics of the driving road, and the driving speed of the vehicle. In an embodiment of the disclosure, the electronic device 1000 may determine the safe speed to be less than a speed limit determined based on the characteristics of the driving road, by a preset value. For example, the safe speed may be determined to be 25 km/h when the speed limit in a school zone is 30 km/h, or be determined to be 100 km/h when the speed limit on an expressway is 110 km/h. However, the safe speed is not limited thereto, and the electronic device 1000 may determine the safe speed to be equal to the speed limit preset based on the characteristics of the driving road.

In operation S820, the electronic device 1000 may determine weights for one or more voice command guidance UIs, based on at least one of the vehicle driving information, occupant information, display output information, or the safe speed.

In an embodiment of the disclosure, the processor 1200 (see FIG. 2) of the electronic device 1000 may compare the driving speed of the vehicle to the safe speed, and determine the weights of the one or more voice command guidance UIs depending on the comparison result. In an embodiment of the disclosure, when the driving speed is greater than the safe speed, the processor 1200 may determine that a driver needs to pay attention to driving for safety, and adjust a weight of one or more voice command guidance UIs for executing functions related to driving to a high value, and adjust a weight of one or more voice command guidance UIs for executing convenience functions other than driving, e.g., functions related to music playback to a lower value. In an opposite embodiment of the disclosure, when the driving speed is less than the safe speed, the processor 1200 may determine that a sufficient margin of safety for driving is present, and thus the driver may pay more attention to secondary vehicle functions (e.g., convenience and entertainment functions), and adjust the weight of the one or more voice command guidance UIs for executing the convenience functions to a higher value.

In an embodiment of the disclosure, the processor 1200 may set a higher weight for voice command guidance UIs related to functions of frequently used applications compared to other voice command guidance UIs, based on usage history information of an occupant.

In an embodiment of the disclosure, the processor 1200 may set a higher weight for voice command guidance UIs related to applications executed using icons or widgets displayed on the display 1610 compared to a weight of voice command guidance UIs related to other non-displayed applications.

In operation S830, the electronic device 1000 determines at least one of the number, location, or size of the one or more voice command guidance UIs to be displayed, based on the weights. In an embodiment of the disclosure, the electronic device 1000 may determine whether to display the one or more voice command guidance UIs, a display location, or a display size thereof, based on the weights. For example, the electronic device 1000 may determine to display one or more voice command guidance UIs having a weight greater than a preset threshold, and to exclude from display one or more voice command guidance UIs having a weight less than the preset threshold. For example, the electronic device 1000 may determine to display one or more voice command guidance UIs having a first weight, in a larger size compared to a size of one or more voice command guidance UIs having a second weight that is less than the first weight.

In operation S840, the electronic device 1000 may display the one or more voice command guidance UIs based on the determined number, location, and size. In an embodiment of the disclosure, the electronic device 1000 may display one or more voice command guidance UIs having a weight greater than a preset threshold. In another embodiment of the disclosure, the electronic device 1000 display one or more voice command guidance UIs having a high weight, in a larger size compared to a size of one or more voice command guidance UIs having a low weight.

Figure 9A:
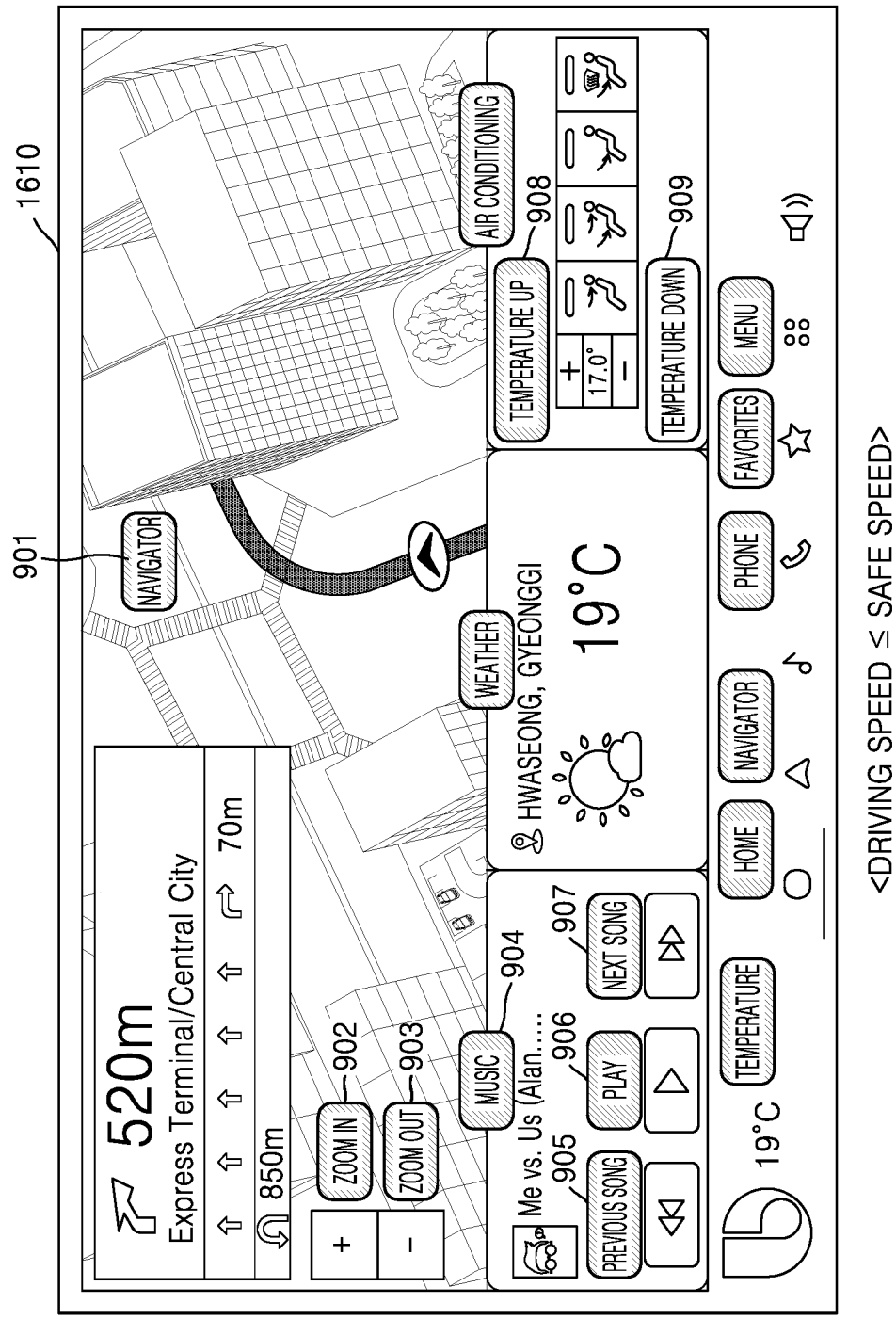
FIG. 9A is a diagram showing an electronic device displaying voice command guidance UIs based on a driving speed, according to an embodiment of the disclosure.

FIG. 9A is a diagram showing the electronic device 1000 displaying voice command guidance UIs based on a driving speed, according to an embodiment of the disclosure. FIG. 9A shows an example in which the electronic device 1000 displays a plurality of voice command guidance UIs 901 to 909 on the display 1610 when a driving speed of the vehicle is less than or equal to a safe speed.

Referring to FIG. 9A, the processor 1200 (see FIG. 2) of the electronic device 1000 may obtain information about the driving speed of the vehicle from the speed sensor 220 (see FIG. 3) of the vehicle, and compare the driving speed to the safe speed. Upon determining that the driving speed of the vehicle is less than or equal to the safe speed, the processor 1200 may display the plurality of voice command guidance UIs 901 to 909 related to a plurality of function UIs for executing functions provided by all applications displayed on the display 1610.

Upon determining that the driving speed of the vehicle is less than or equal to the safe speed, the processor 1200 may display the plurality of voice command guidance UIs 901 to 909 by assigning no weights or the same weight thereto (e.g., because less requisite driver attention is inferred from operation at or under the safe speed). However, the processor 1200 is not limited thereto, and may adjust a weight of voice command guidance UIs for executing functions of a convenience application not related or less related to driving of the vehicle from among a plurality of applications, e.g., a music application or a weather application, to a high value. In the embodiment of the disclosure shown in FIG. 9A, the processor 1200 may adjust a weight assigned to the fourth voice command guidance UI 904 related to execution of the music application, and the fifth voice command guidance UI 905 related to execution of a function for playing a previous song, the sixth voice command guidance UI 906 related to execution of a play and pause function, and the seventh voice command guidance UI 907 related to execution of a function for playing a next song in the music application, to a high value compared to a weight of the other voice command guidance UIs 901, 902, 903, 908, and 909. Although the voice command guidance UIs 901 to 909 are displayed in the same size in FIG. 9A, in an embodiment of the disclosure, the processor 1200 may display the fourth to seventh voice command guidance UIs 904 to 907 in a larger size compared to a size of the other voice command guidance UIs 901, 902, 903, 908, and 909.

Figure 9B:
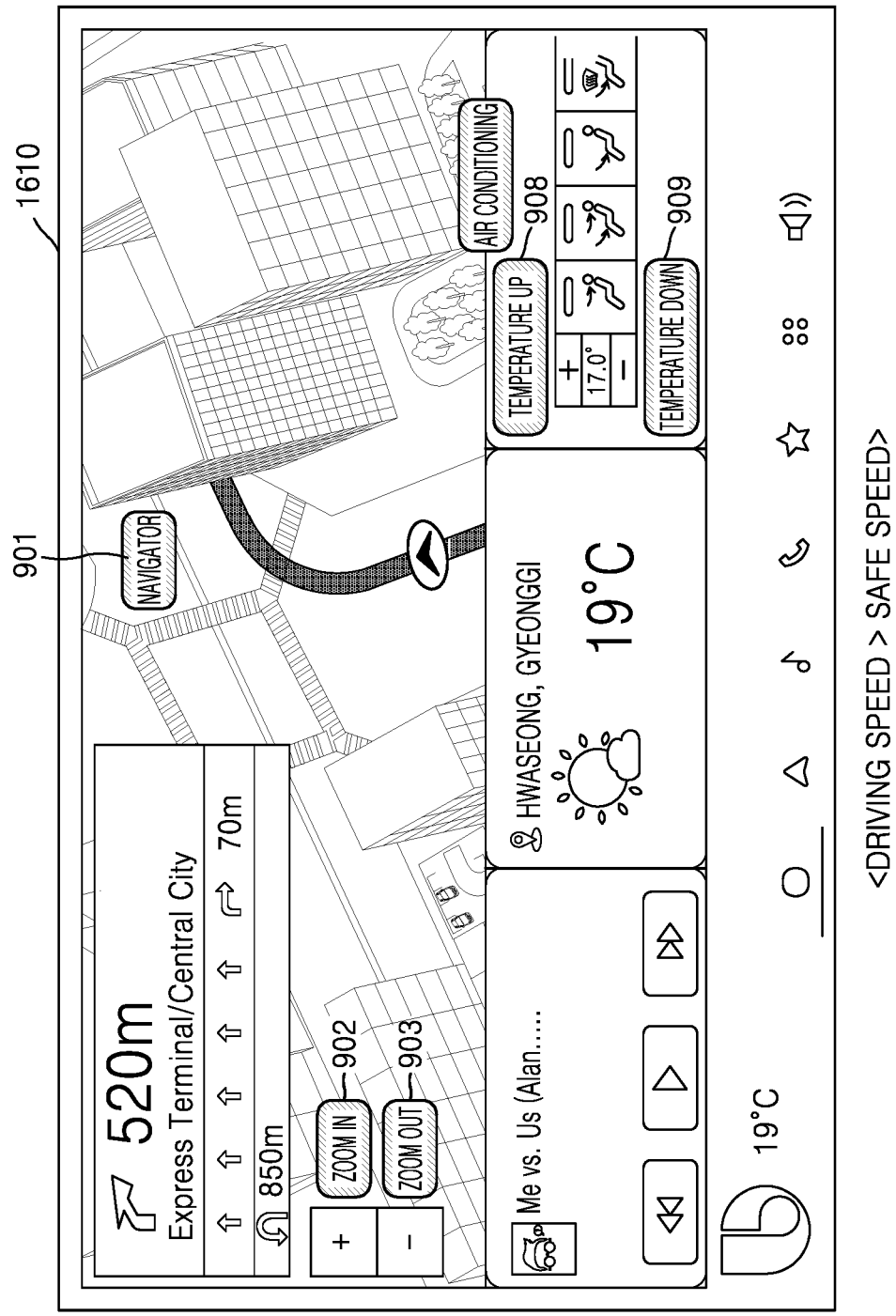
FIG. 9B is a diagram showing an electronic device displaying voice command guidance UIs based on a driving speed, according to an embodiment of the disclosure.

FIG. 9B is a diagram showing the electronic device 1000 displaying voice command guidance UIs based on a driving speed, according to an embodiment of the disclosure. FIG. 9B shows an example in which the electronic device 1000 displays a plurality of voice command guidance UIs 901, 902, 903, 908, and 909 on the display 1610 when the driving speed of the vehicle is greater than a safe speed.

Referring to FIG. 9B, upon determining that the driving speed of the vehicle is greater than the safe speed, the processor 1200 (see FIG. 2) of the electronic device 1000 may display the voice command guidance UIs 901, 902, 903, 908, and 909 corresponding to function UIs for which a high weight is set, from among a plurality of function UIs for executing functions provided by all applications displayed on the display 1610 (e.g., excluding function UIs having an insufficient weight, to simplify the display at a time when more driver attention is inferred as desirable). In an embodiment of the disclosure, upon determining that the driving speed is greater than the safe speed, the processor 1200 may set a high weight for voice command guidance UIs for executing functions related to driving of the vehicle. An application for executing the functions related to driving of the vehicle may be predetermined. The application for executing the functions related to driving of the vehicle may include at least one of, for example, a navigation application or a heating, ventilation, and air conditioning (HVAC) application. In an embodiment of the disclosure, the processor 1200 may set a high weight for an application not directly related to driving of the vehicle but usable while driving, e.g., a phone application. In the embodiment of the disclosure shown in FIG. 9B, the processor 1200 may display the first to third voice command guidance UIs 901 to 903 for executing functions of the navigation application, and the eighth and ninth voice command guidance UIs 908 and 909 for executing functions of the air conditioning application. The processor 1200 may not display the fourth to seventh voice command guidance UIs 904 to 907 having a weight less than a preset threshold.

Figure 10:
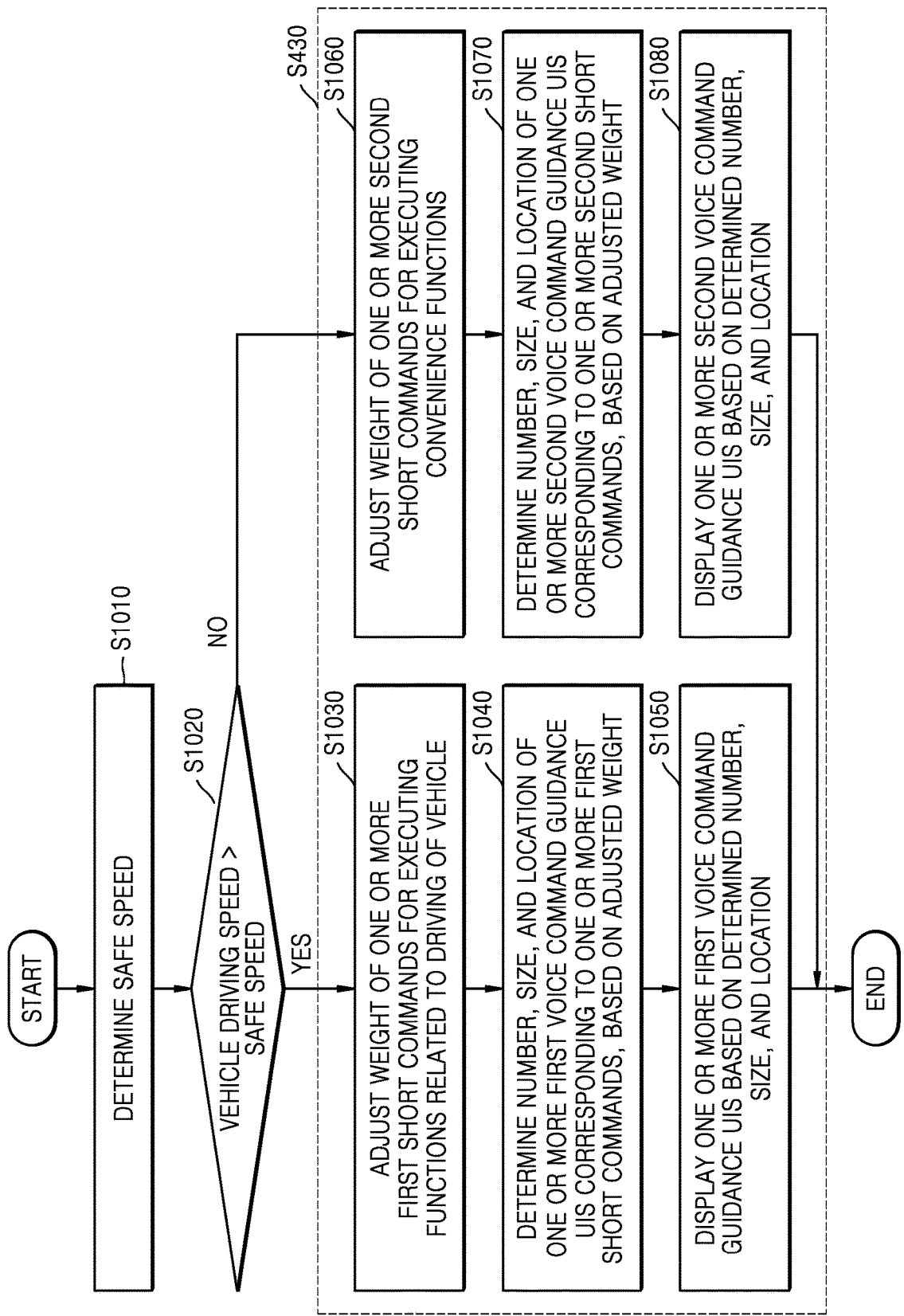
FIG. 10 is a flowchart of a method, performed by an electronic device, of displaying voice command guidance UIs based on a driving speed and a safe speed, according to an embodiment of the disclosure.

FIG. 10 is a flowchart of a method, performed by the electronic device 1000, of displaying voice command guidance UIs based on a driving speed of the vehicle and a safe speed, according to an embodiment of the disclosure.

Referring to FIG. 10, an example in which the electronic device 1000 assigns weights to the voice command guidance UIs based on the driving speed of the vehicle and the safe speed, and displays the voice command guidance UIs by adjusting the number, location, and size of the voice command guidance UIs based on the weights is shown. Operations S1030 to S1080 shown in FIG. 8 are subdivided from operation S430 shown in FIG. 4.

In operation S1010, the electronic device 1000 may determine the safe speed. In an embodiment of the disclosure, the electronic device 1000 may determine the safe speed based on information on a current location, characteristics of a present road on which the vehicle is operating, and the present driving speed of the vehicle. Operation S1010 is the same as operation S810 shown in FIG. 8, and thus a repeated description therebetween is not provided herein.

In operation S1020, the electronic device 1000 may determine whether the present driving speed is greater than the safe speed, by comparing the present speed of the vehicle to the safe speed.

Upon determining that the driving speed of the vehicle is greater than the safe speed (e.g., and that additional attention to driving is desirable), in operation S1030, the electronic device 1000 may adjust a weight of one or more first short commands for executing functions related to driving of the vehicle. The one or more first short commands are commands for executing functions of at least one application related to driving of the vehicle, and the at least one application may be predetermined. The application for executing the functions related to driving of the vehicle may include at least one of, for example, a navigation application or an HVAC application. In an embodiment of the disclosure, the electronic device 1000 may adjust the weight of the one or more first short commands for executing functions provided by the navigation application and the HVAC application, to a high value.

In an embodiment of the disclosure, the electronic device 1000 may adjust a weight of short commands for executing functions of an application not directly related to driving of the vehicle but usable while driving, e.g., a phone application, to a high value.

In operation S1040, the electronic device 1000 determines the number, size, and location of one or more first voice command guidance UIs corresponding to the one or more first short commands, based on the adjusted weight. In an embodiment of the disclosure, the electronic device 1000 may determine the number to display one or more first voice command guidance UIs visually representing the one or more first short commands by using text, numbers, or symbols, or display UIs having a weight greater than a threshold from among the one or more first voice command guidance UIs. In an embodiment of the disclosure, the electronic device 1000 may determine to display the one or more first voice command guidance UIs in a larger size compared to a size of other voice command guidance UIs.

In operation S1050, the electronic device 1000 displays the one or more first voice command guidance UIs based on the determined number, size, and location (e.g., thereby simplifying the display to enhance driver attention to vehicle operation).

Upon determining that the driving speed of the vehicle is less than or equal to the safe speed (e.g., and thus, inferring that it is safe for allow driver attention to be directed to secondary, convenience or entertainment functions), in operation S1060, the electronic device 1000 may adjust a weight of one or more second short commands for executing convenience functions. The one or more second short commands are commands for executing convenience functions less related to driving of the vehicle. An application related to convenience functions may be predetermined. The application for executing convenience functions of the vehicle may include, for example, a music application or a weather application. In an embodiment of the disclosure, the electronic device 1000 may adjust the weight of the one or more second short commands for executing functions provided by the music application and the weather application, to a high value.

In operation S1070, the electronic device 1000 determines the number, size, and location of one or more second voice command guidance UIs corresponding to the one or more second short commands, based on the adjusted weight. In an embodiment of the disclosure, the electronic device 1000 may determine the number to display one or more second voice command guidance UIs visually representing the one or more second short commands by using text, numbers, or symbols, or display UIs having a weight greater than a threshold from among the one or more second voice command guidance UIs. In an embodiment of the disclosure, the electronic device 1000 may determine to display the one or more second voice command guidance UIs in a larger size compared to a size of other voice command guidance UIs.

In operation S1080, the electronic device 1000 displays the one or more second voice command guidance UIs based on the determined number, size, and location.

Figure 11:
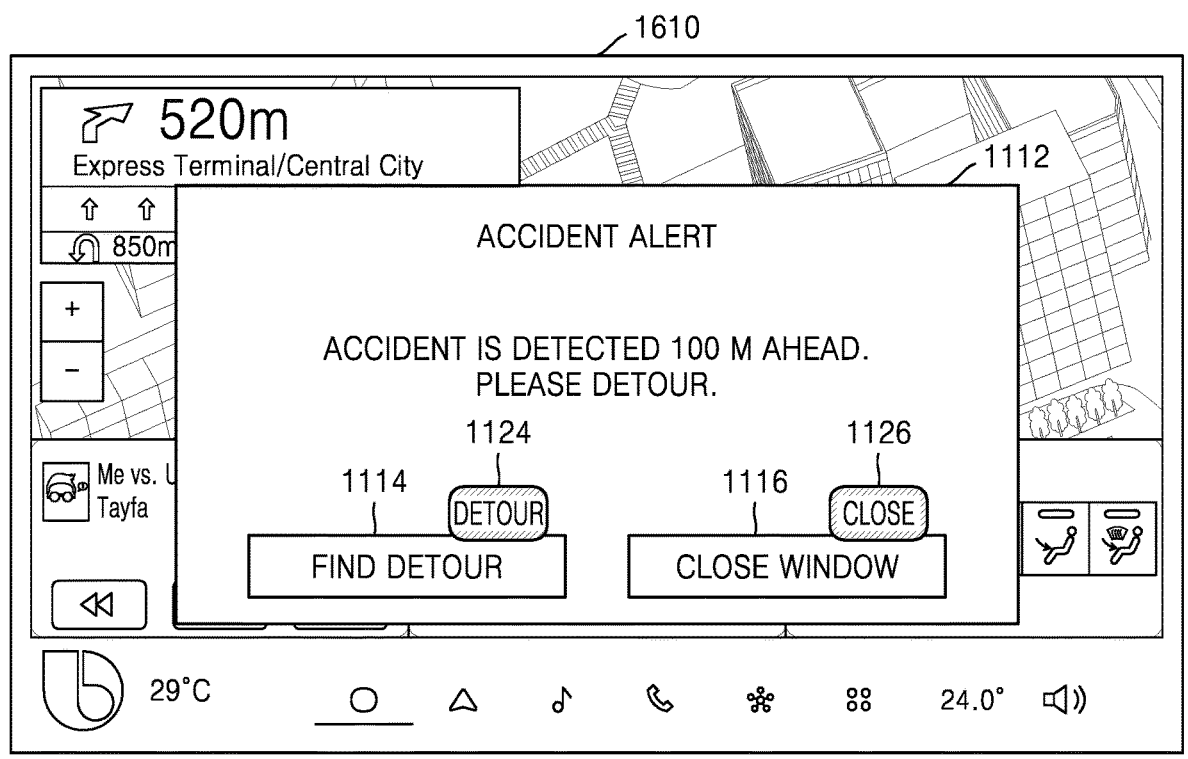
FIG. 11 is a diagram showing an electronic device displaying voice command guidance UIs related to a pop-up message, according to an embodiment of the disclosure.

FIG. 11 is a diagram showing the electronic device 1000 displaying voice command guidance UIs 1124 and 1126 related to a pop-up message 1112, according to an embodiment of the disclosure.

Referring to FIG. 11, the electronic device 1000 may display the pop-up message 1112 on the display 1610. In an embodiment of the disclosure, the processor 1200 (see FIG. 2) of the electronic device 1000 may detect an event, e.g., such as an error in a running application, an application update confirming of timing, or a nearby accident, and display the pop-up message 1112 as an alert message. In an embodiment of the disclosure, the pop-up message 1112 may be displayed overlaying launch screens of applications and UIs output on the display 1610. In the embodiment of the disclosure shown in FIG. 11, the pop-up message 1112 may be an alert message notifying of an accident 100 m ahead, and include a first UI 1114 requesting searching for a detour, and a second UI 1116 for closing the pop-up message 1112.

The processor 1200 may display the voice command guidance UIs 1124 and 1126 for executing the function UIs 1114 and 1116 related to a function for removing the pop-up message 1112 from the display 1610. In an embodiment of the disclosure, the processor 1200 may set a high weight for the voice command guidance UIs 1124 and 1126 for removing the pop-up message 1112 compared to a weight assigned to other voice command guidance UIs. For example, the processor 1200 may set the highest weight for the voice command guidance UIs 1124 and 1126 for executing the function for removing the pop-up message 1112 from the display 1610.

When the pop-up message 1112 is suddenly and unexpectedly displayed to cover a navigation screen, a driver may be distracted from their navigational route, and take a wrong turn. In addition, because the pop-up message 1112 covers other function UIs displayed on the display 1610, user convenience may be reduced. In the embodiment of the disclosure shown in FIG. 11, the electronic device 1000 may allow the driver to easily remove the pop-up message 1112, by setting a high weight to ensure the voice command guidance UIs 1124 and 1126 are displayed for removing the pop-up message 1112 from the display 1610.

Figure 12:
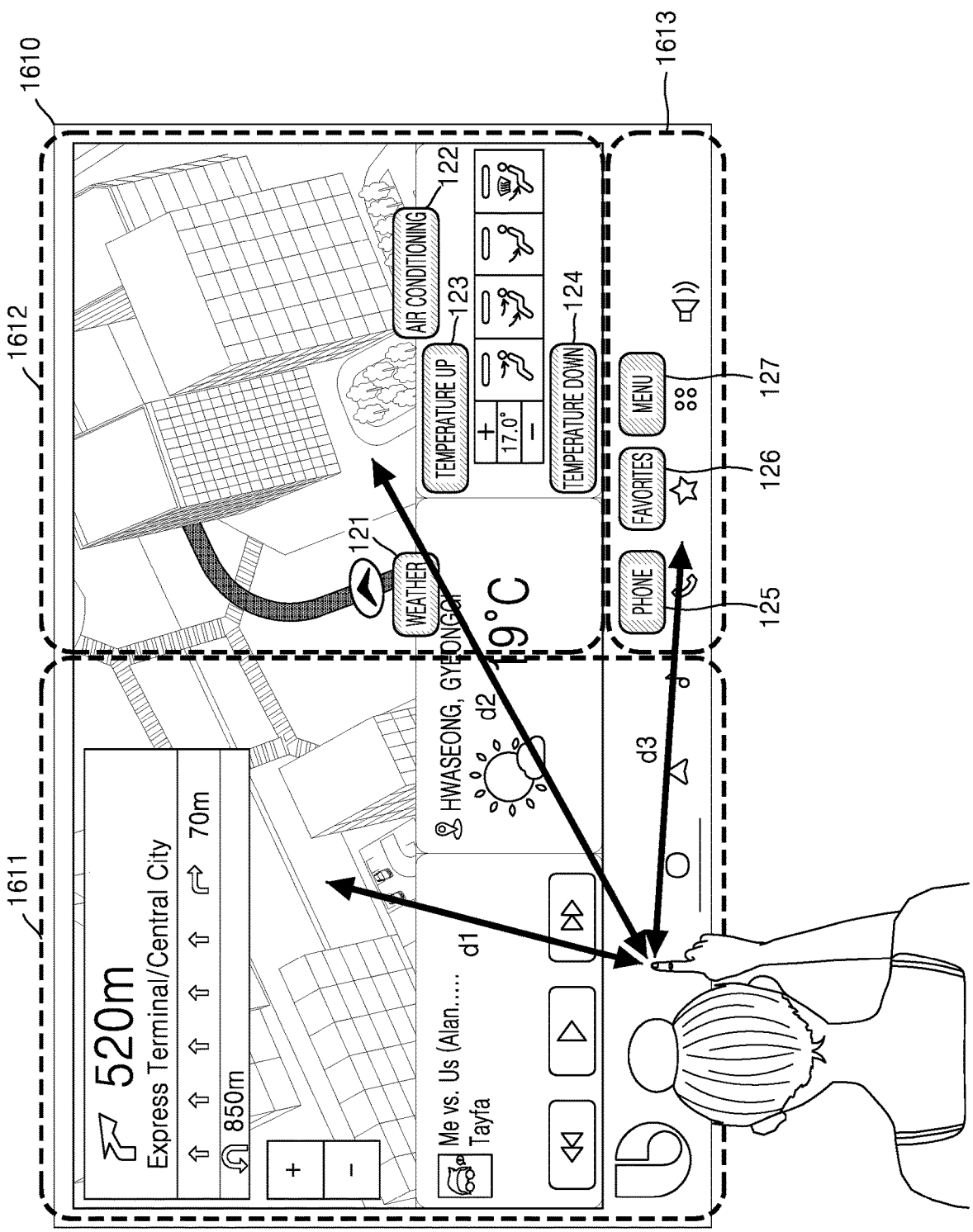
FIG. 12 is a diagram showing an electronic device displaying voice command guidance UIs on a partial area of a display, according to an embodiment of the disclosure.

FIG. 12 is a diagram showing the electronic device 1000 displaying voice command guidance UIs 121 to 127 on a partial area of the display 1610, according to an embodiment of the disclosure.

Referring to FIG. 12, the processor 1200 (see FIG. 2) of the electronic device 1000 may divide the display 1610 into a plurality of areas 1611, 1612, and 1613, and display the voice command guidance UIs 121 to 127 based on distances between a location of an occupant and the plurality of areas 1611, 1612, and 1613 of the display 1610.

The processor 1200 may measure the distances between the plurality of areas 1611, 1612, and 1613 of the display 1610 and the location of the occupant. In an embodiment of the disclosure, the processor 1200 may obtain location information of the occupant from the infrared sensor 240 (see FIG. 3) of the vehicle sensor module 200 (see FIG. 3). In the embodiment of the disclosure shown in FIG. 12, the distance between the first area 1611 of the display 1610 and the occupant may be measured as a first distance d1, the distance between the second area 1612 and the occupant may be measured as a second distance d2, and the distance between the third area 1613 and the occupant may be measured as a third distance d3.

The processor 1200 may display the voice command guidance UIs 121 to 127 on an area distal from the location of the occupant by a preset reference value or more, from among the plurality of areas 1611, 1612, and 1613 of the display 1610. In the embodiment of the disclosure shown in FIG. 12, the second and third distances d2 and d3 may be measured to be greater than or equal to the reference value, and thus, the processor 1200 may display the voice command guidance UIs 121 to 127 to the second and third areas 1612 and 1613. In this case, the processor 1200 may display no voice command guidance UIs on the first area 1611 of the display 1610, since d1 is less than the preset reference value (e.g., suggesting that the user is able to enter touch inputs to this region without difficulty).

Although the voice command guidance UIs 121 to 127 are displayed based on the distance between the location of the occupant and each area of the display 1610 in the above description, the embodiment of the disclosure is not limited thereto. In an embodiment of the disclosure, the electronic device 1000 may divide a space in the vehicle into spaces of a driver's seat, a passenger seat, and left and right rear seats, and divide the display 1610 into a plurality of areas corresponding to the divided spaces. The electronic device 1000 may display the voice command guidance UIs 121 to 127 on an area not easily touchable by the occupant from among the plurality of divided areas of the display 1610. For example, the display 1610 may be divided into an area assigned for the driver's seat and an area assigned for the passenger seat, and the electronic device 1000 may display the voice command guidance UIs 121 to 127 on the area assigned for the passenger seat and far from the driver to touch icons or widgets from among the plurality of areas.

Because the display 1610 provided in the vehicle is sometimes large in moderns, the occupants may be forced to take additional action to enter touch inputs to the display 1610 while driving (e.g., such as bending forward), and thus the driver may become distracted. In the embodiment of the disclosure shown in FIG. 12, because the electronic device 1000 displays the voice command guidance UIs 121 to 127 distal areas not easily touchable by a driver (or passenger) (e.g., the second and third areas 1612 and 1613 in the embodiment of the disclosure shown in FIG. 12) from among the plurality of areas 1611, 1612, and 1613 of the display 1610, a driver (or passenger) may execute a function based on utterance without attempting to enter touch inputs the UI (e.g., such as selection of an icon or a widget), and the driver may be less distracted while driving.

Figure 13:
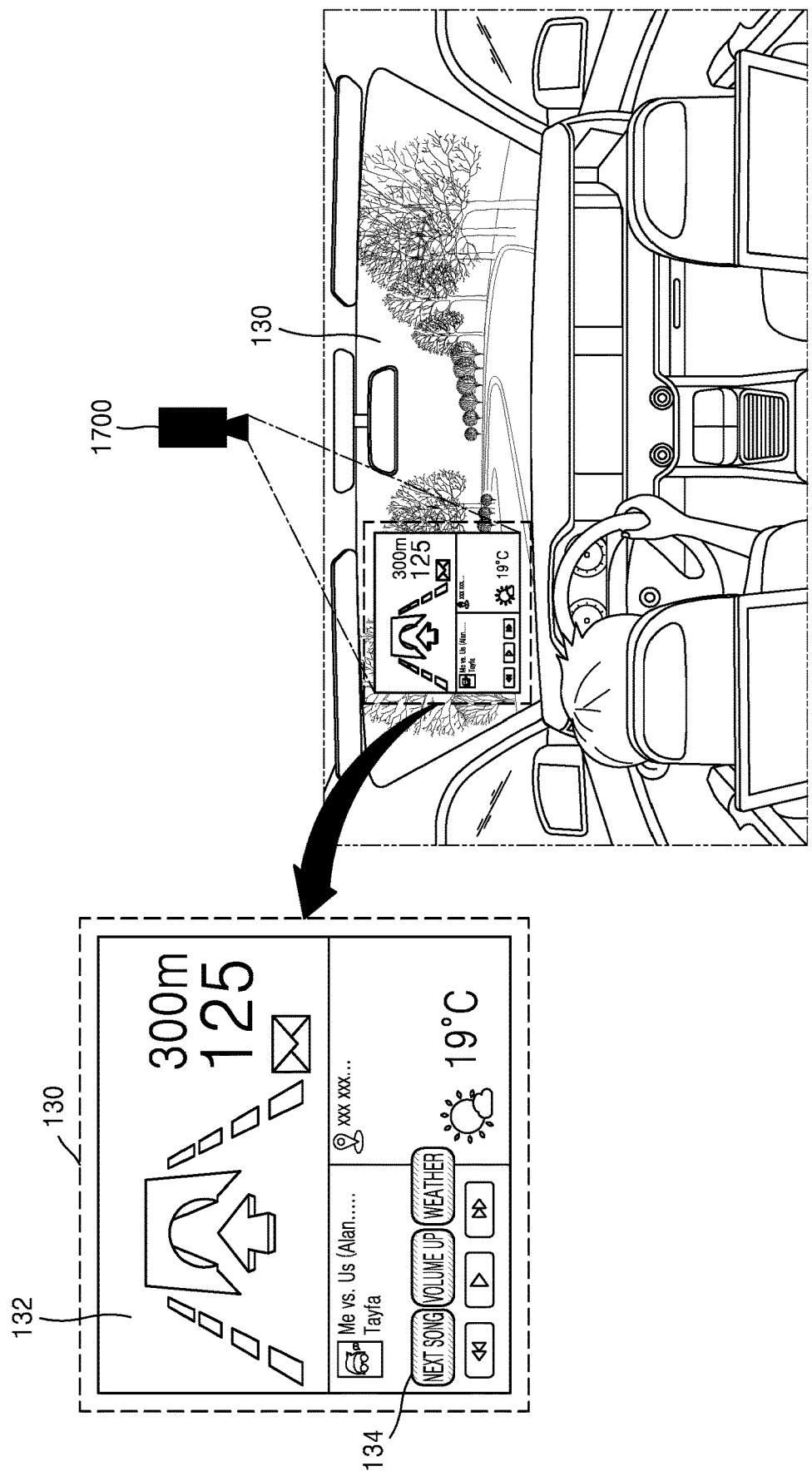
FIG. 13 is a diagram showing an electronic device displaying voice command guidance UIs on a head-up display (HUD), according to an embodiment of the disclosure.

FIG. 13 is a diagram showing the electronic device 1000 displaying voice command guidance UIs 134 on a HUD 130, according to an embodiment of the disclosure.

Referring to FIG. 13, the electronic device 1000 may display an application UI 132 and the voice command guidance UIs 134 on the HUD 130. The electronic device 1000 may include a projector 1700. The projector 1700 may be configured to project an image onto a windshield of the vehicle. The projector 1700 may be configured to generate light of an image, and including an image panel, an illumination optical system, a projection optical system, etc. In an embodiment of the disclosure, the projector 1700 may obtain, from the processor 1200 (see FIG. 2), data including images of the application UI 132 and the voice command guidance UIs 134 included in the launch screen of an application, generate a virtual image based on the obtained image data, and project, through an exit surface onto the windshield, light of the virtual image output from a light source. The image projected by the projector 1700 may be displayed on the HUD 130 on the windshield.

Although the application UI 132 and the voice command guidance UIs 134 are displayed on the HUD 130 in FIG. 13, the HUD 130 is not limited thereto. In an embodiment of the disclosure, the voice command guidance UIs 134 may be displayed on the HUD 130.

In the embodiment of the disclosure shown in FIG. 13, because the electronic device 1000 displays the voice command guidance UIs 134 on the HUD 130, a driver may intuitively understand a short command for executing a function without bending his/her head forward to see a CID or a navigation screen, thereby increasing user convenience and reducing distracted driving.

Figure 14:
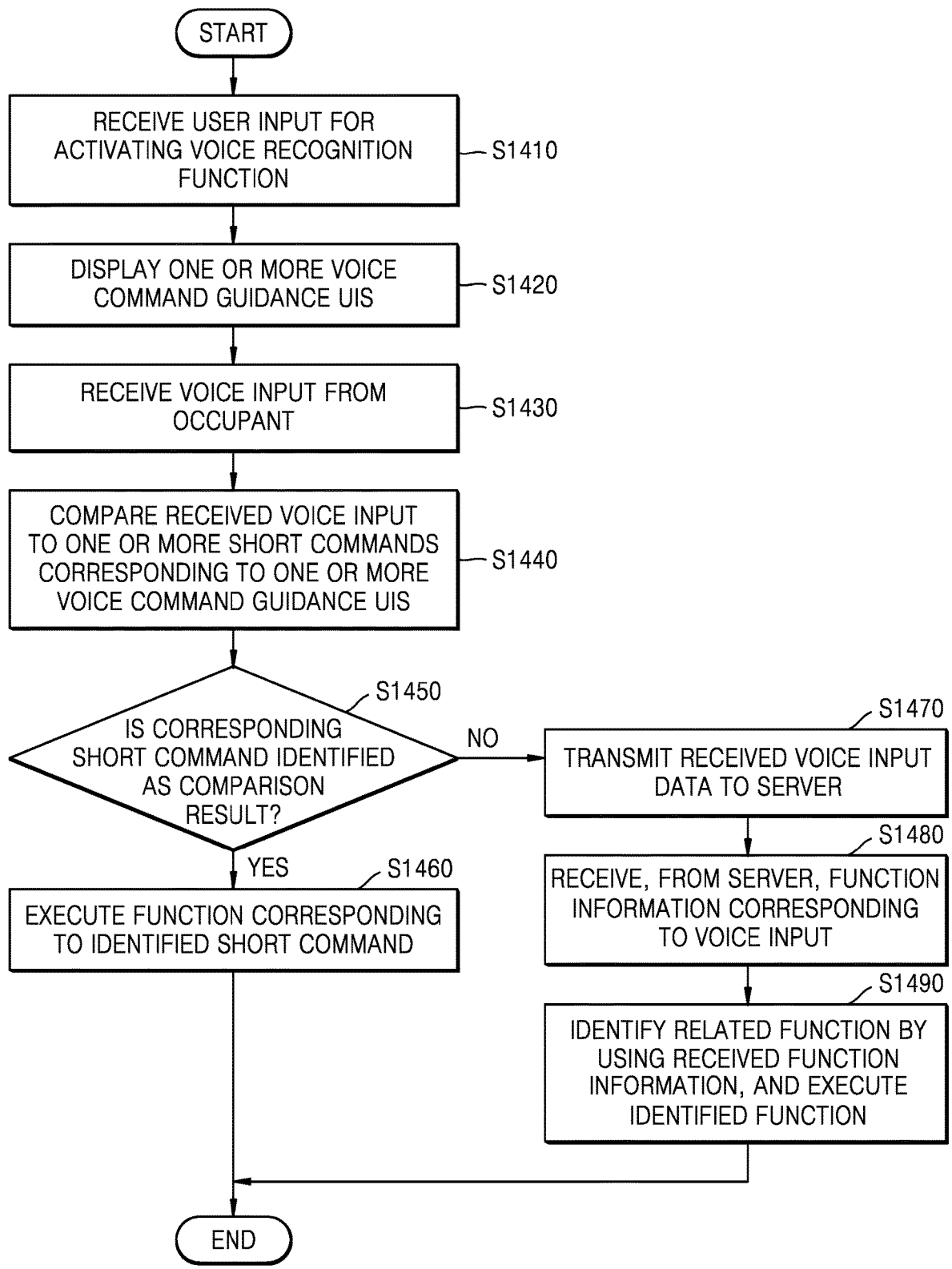
FIG. 14 is a flowchart of a method, performed by an electronic device, of performing a voice recognition function, according to an embodiment of the disclosure.

FIG. 14 is a flowchart of a method, performed by the electronic device 1000, of performing a voice recognition function, according to an embodiment of the disclosure.

In operation S1410, the electronic device 1000 may receive a user input for activating a voice recognition function. In an embodiment of the disclosure, the processor 1200 (see FIG. 2) of the electronic device 1000 may receive, through the voice recognition function inputter 1510 (see FIG. 2), the user input for activating the voice recognition function. The voice recognition function inputter 1510 may be a hardware button disposed on a steering wheel or a dashboard of the vehicle. However, the voice recognition function inputter 1510 is not limited thereto, and may be a selectable GUI element displayed on the display 1610.

In an embodiment of the disclosure, the processor 1200 may receive, through the microphone 1520 (see FIG. 2), wake-up voice for activating the voice recognition function. The wake-up voice may include, for example, 'Hi Bixby' or 'OK Google'.

In operation S1420, the electronic device 1000 may display one or more voice command guidance UIs. Upon receiving the user input in operation S1410, the electronic device 1000 may activate the voice recognition function and display the one or more voice command guidance UIs on the display 1610.

In operation S1430, the electronic device 1000 may receive a voice input from an occupant. In an embodiment of the disclosure, the processor 1200 of the electronic device 1000 may receive, through the microphone 1520, a voice input uttered by at least one occupant (e.g., a driver, a front passenger, or a rear passenger).

In operation S1440, the electronic device 1000 may compare the received voice input to one or more short commands corresponding to the one or more voice command guidance UIs. In an embodiment of the disclosure, the processor 1200 of the electronic device 1000 may convert the received voice input into computer-readable text by performing automatic speech recognition (ASR). The processor 1200 may compare the converted text to the one or more short commands corresponding to the one or more voice command guidance UIs.

When a short command corresponding to the text is identified in operation S1450, the electronic device 1000 executes a function corresponding to the identified short command in operation S1460. For example, when the voice input received from the occupant is "Volume up", the electronic device 1000 may identify a short command matching 'Volume up' from among the one or more short commands corresponding to the displayed one or more voice command guidance UIs, and execute a media volume up function corresponding to the identified short command.

When a short command corresponding to the text is not identified as the comparison result in operation S1450, the electronic device 1000 transmits the voice input data to a server in operation S1470. In an embodiment of the disclosure, the electronic device 1000 may transmit the voice input data to the server using the data communication module 1120 (see FIG. 2). The electronic device 1000 may transmit the voice input data to the server by using, for example, short-range wireless communication including WLAN (or Wi-Fi), WiBro, WiMAX, or Bluetooth, or a mobile communication network such as CDMA, WCDMA, 3G, 4G, 5G, and/or mmWave.

The electronic device 1000 may transmit the voice input data received in operation S1430, to the server without additional processing, but is not limited thereto. In an embodiment of the disclosure, the electronic device 1000 may convert the voice input into text, and transmit the converted text to the server.

In operation S1480, the electronic device 1000 receives, from the server, function information corresponding to the voice input. The server may receive the voice input data from the electronic device 1000, and detect the intent of the occupant by analyzing the voice input data by using a natural language understanding model. The server may identify a function according to the detected intent, and transmit information about the identified function to the electronic device 1000.

In operation S1490, the electronic device 1000 identifies a related function by using the function information received from the server, and executes the identified function.

In the embodiment of the disclosure shown in FIG. 14, the electronic device 1000 may display the one or more voice command guidance UIs, and identify a matching short command by comparing the voice input received from the occupant, to the one or more short commands corresponding to the one or more voice command guidance UIs, in advance before transmitting the voice input to the server. Because the electronic device 1000 executes a function related to the identified short command when the matching short command is identified, the function may be executed in an on-device manner without accessing the server. Therefore, the electronic device 1000 according to an embodiment of the disclosure may reduce time and communication costs utilized to communicate with the server, and technically increase accuracy of voice recognition.

Figure 15:
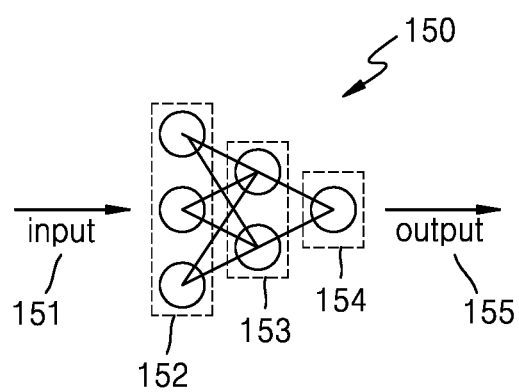
FIG. 15 is a diagram for describing operations of an electronic device performed using artificial intelligence (AI) technology, according to an embodiment of the disclosure.

FIG. 15 is a diagram for describing operations of the electronic device 1000 performed using AI technology, according to an embodiment of the disclosure.

Specifically, at least one operation performed by the electronic device 1000 from among an operation i) of obtaining at least one of vehicle driving information, occupant information, or display output information, an operation ii) of generating one or more short commands by shortening voice commands for executing one or more functions provided by the vehicle or the electronic device 1000 according to a voice input received from an occupant, based on the obtained information, and an operation iii) of displaying one or more voice command guidance UIs visually representing the generated one or more short commands, may be performed using artificial intelligence (AI) technology for performing computation through a neural network.

The 'AI technology' is a technology for obtaining a desired result by processing, e.g., analyzing and/or classifying, input data based on computation through a neural network.

The AI technology may be implemented using an algorithm. Herein, an algorithm or a set of algorithms for implementing the AI technology is referred to as a neural network. Herein, the neural network may receive input data, and output resultant data by performing computation for analysis and/or classification as mentioned above. The neural network needs to be trained to accurately output the resultant data corresponding to the input data. Herein, 'training' may refer to training the neural network to autonomously find or discover a method of analyzing input data of the neural network, a method of classifying the input data, and/or a method of extracting, from the input data, features utilized to generate resultant data. Specifically, the neural network may be trained on training data (e.g., a plurality of different images) to optimize weight values in the neural network. A desired result is output by processing the input data though the neural network having the optimized weight values.

When the neural network includes a plurality of hidden layers for performing computation, i.e., when a depth of the neural network for performing computation increases, the neural network may be classified as a deep neural network. The neural network includes, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), and a deep Q-network, but is not limited thereto. The neural networks may be subdivided. For example, the CNN may be subdivided into a deep convolutional neural network (DCNN) or a CapsNet (not shown).

An 'AI model' may refer to a neural network including at least one layer configured to receive input data and output a desired result. The 'AI model' may also refer to an algorithm for outputting a desired result by performing computation through a neural network, a set of a plurality of algorithms, a processor for executing an algorithm (or a set of algorithms), software for executing an algorithm (or a set of algorithms), or hardware for executing an algorithm (or a set of algorithms).

At least one of the operation i) of obtaining the at least one of the vehicle driving information, the occupant information, or the display output information, the operation ii) of generating the one or more short commands by shortening the voice commands for executing the one or more functions provided by the vehicle or the electronic device 1000 according to the voice input received from the occupant, based on the obtained information, and the operation iii) of displaying the one or more voice command guidance UIs visually representing the generated one or more short commands may be performed based on the AI model.

Referring to FIG. 15, a neural network 150 may be trained by receiving training data. The trained neural network 150 may receive input data 151 through an input layer 152, and the input layer 152, a hidden layer 153, and an output layer 154 may perform computation for outputting output data 155 by analyzing the input data 151 and data received from a previous layer. Although one hidden layer 153 is illustrated in FIG. 15, one is merely an example and the hidden layer 153 may include a plurality of layers.

In the disclosed embodiment of the disclosure, the neural network 150 may be trained to obtain user identification information and usage history information of an occupant based on log-in information, obtain information about applications frequently used by the occupant, based on the user identification information and the usage history information, and generate one or more short commands by shortening commands for executing functions of the frequently used applications.

In the disclosed embodiment of the disclosure, the neural network 150 may be trained to detect functions represented by one or more GUIs output on the display 1610 (see FIG. 2), and generate one or more short commands corresponding to the one or more GUIs by converting the detected functions into a natural language.

In the disclosed embodiment of the disclosure, the neural network 150 may be trained to display one or more voice command guidance UIs at a location correspondingly adjacent to the one or more GUIs for executing the functions.

In the disclosed embodiment of the disclosure, the neural network 150 may be trained to determine a safe speed based on information about a current location, a driving road, and a driving speed of the vehicle, determine weights of the one or more voice command guidance UIs based on at least one of the vehicle driving information, the occupant information, the display output information, or the determined safe speed, determine the number, location, and size of the one or more voice command guidance UIs to be displayed, based on the determined weights, and display the one or more voice command guidance UIs based on the determined number, location, and size.

In the disclosed embodiment of the disclosure, the neural network 150 may be trained to determine whether the driving speed of the vehicle is greater than the safe speed, based on the vehicle driving information, and change a weight of one or more first voice command guidance UIs for executing functions related to driving of the vehicle and a weight of one or more second voice command guidance UIs for executing convenience functions, based on the determination result.

In the disclosed embodiment of the disclosure, the neural network 150 may be trained to adjust a weight of a voice command guidance UI for executing a function for removing a displayed pop-up message.

In the disclosed embodiment of the disclosure, the neural network 150 may be trained to measure a distance between the occupant and the display 1610 based on seat location information of the occupant, determine an area for displaying the one or more voice command guidance UIs on the display 1610, based on the measured distance, and display the one or more voice command guidance UIs on the determined area.

In the disclosed embodiment of the disclosure, data or program code related to the neural network 150 for performing at least one of the operation i) of obtaining the at least one of the vehicle driving information, the occupant information, or the display output information, the operation ii) of generating the one or more short commands by shortening the voice commands for executing the one or more functions provided by the vehicle or the electronic device 1000 according to the voice input received from the occupant, based on the obtained information, and the operation iii) of displaying the one or more voice command guidance UIs visually representing the generated one or more short commands may be stored in the memory 1300 (see FIG. 2), and training using the neural network 150 may be performed by the processor 1200 (see FIG. 2).

Alternatively, the neural network 150 for performing at least one of the operation i) of obtaining the at least one of the vehicle driving information, the occupant information, or the display output information, the operation ii) of generating the one or more short commands by shortening the voice commands for executing the one or more functions provided by the vehicle or the electronic device 1000 according to the voice input received from the occupant, based on the obtained information, and the operation iii) of displaying the one or more voice command guidance UIs visually representing the generated one or more short commands may be implemented in a separate device or processor (not shown) other than the electronic device 1000.

The computation through the neural network 150 may be performed by a server 2000 (see FIGS. 16 and 17) which may communicate with the electronic device 1000 according to an embodiment of the disclosure through a wireless communication network. Communication between the electronic device 1000 and the server 2000 will be described below with reference to FIGS. 16 and 17.

Figure 16:
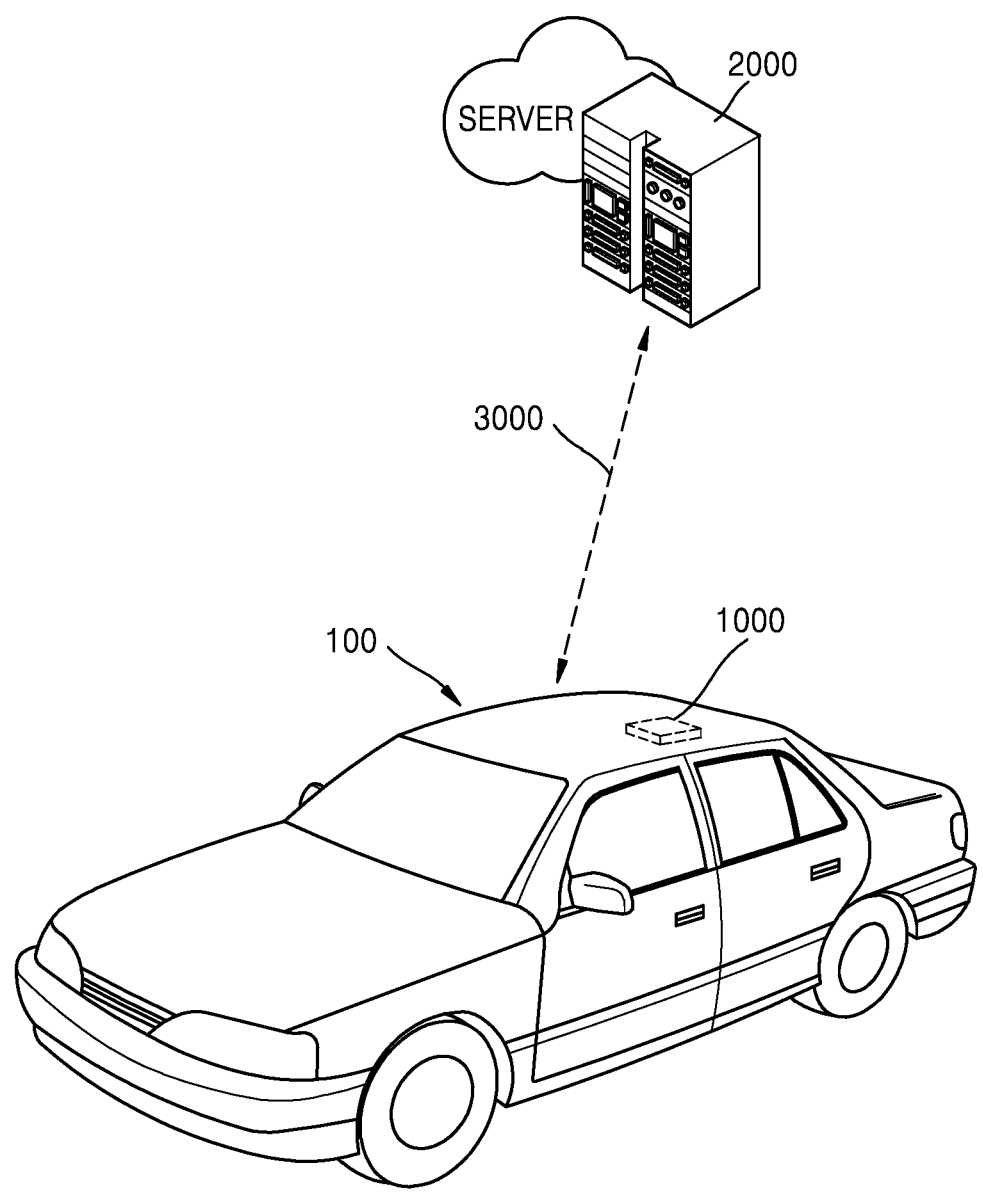
FIG. 16 is a diagram showing an electronic device operating in conjunction with a server, according to an embodiment of the disclosure.

FIG. 16 is a diagram showing the electronic device 1000 operating in conjunction with the server 2000, according to an embodiment of the disclosure.

The server 2000 may transmit and receive data to and from the electronic device 1000 through a communication network 3000, and process the data.

Figure 17:
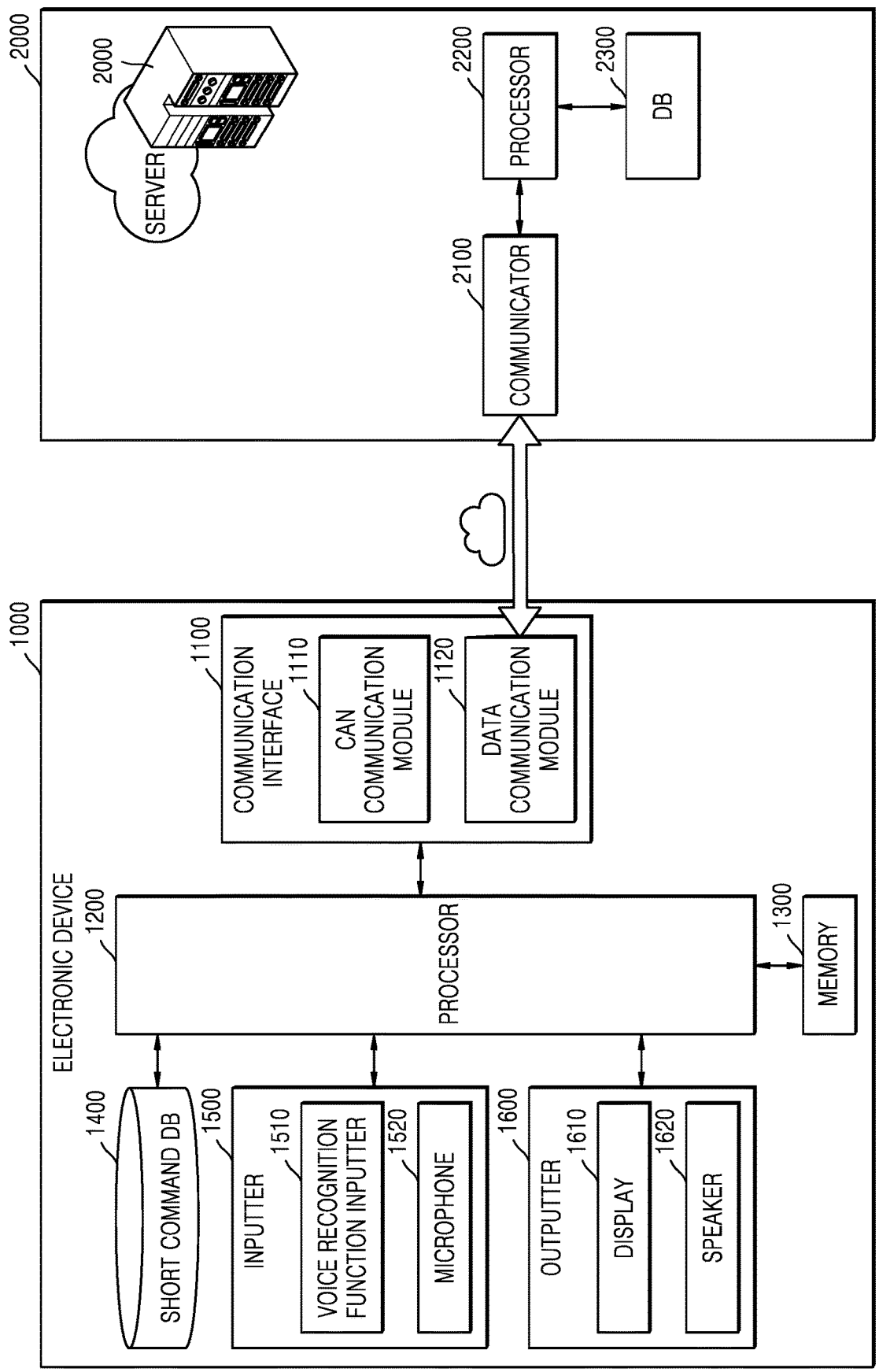
FIG. 17 is a diagram for describing FIG. 16 in detail.

Referring to FIGS. 16 and 17, the server 2000 may include a communicator 2100 for communicating with the electronic device 1000, a processor 2200 for performing one or more instructions, and a DB 2300.

The server 2000 may train an AI model and store the trained AI model. The server 2000 may perform, using the trained AI model, at least one of the operation i) of obtaining the at least one of the vehicle driving information, the occupant information, or the display output information, the operation ii) of generating the one or more short commands by shortening the voice commands for executing the one or more functions provided by the vehicle or the electronic device 1000 according to the voice input received from the occupant, based on the obtained information, and the operation iii) of displaying the one or more voice command guidance UIs visually representing the generated one or more short commands.

In general, the electronic device 1000 may be inferior to the server 2000 in memory storage capacity, computation speed, training dataset collection ability, etc. Therefore, an operation utilizing a large amount of data or computation may be performed by the server 2000, and then data and/or AI model may be transmitted through a communication network to the electronic device 1000. Then, without a large-capacity memory and a high-speed processor, the electronic device 1000 may rapidly and easily perform an operation by receiving and using the utilized data and/or AI model from the server 2000.

In the disclosed embodiment of the disclosure, the server 2000 may include the neural network 150 described above in relation to FIG. 15.

FIG. 17 is a diagram for describing FIG. 16 in detail.

Referring to FIG. 17, the server 2000 may include the communicator 2100, the processor 2200, and the DB 2300.

The communicator 2100 performs communication with an external device through a wireless communication network. Herein, the external device (not shown) may include a server capable of performing at least one of computations utilized by the electronic device 1000, or of transmitting data utilized by the electronic device 1000.

The communicator 2100 includes at least one communication module such as a short-range wireless communication module, a wired communication module, a mobile communication module, or a broadcast receiver module. Herein, the at least one communication module refers to a tuner for receiving broadcast signals, or a communication module capable of transmitting and receiving data through a network complying with a communication standard such as Bluetooth, WLAN (or Wi-Fi), WiBro, WiMAX, CDMA, WCDMA, Internet, 3G, 4G, 5G, and/or mmWave.

For example, when the communicator 2100 performs communication by using mmWave, a large amount of data may be rapidly transmitted and received. Specifically, the vehicle may rapidly receive a large amount data by using mmWave, and rapidly provide data utilized for safety of the vehicle (e.g., data utilized for autonomous driving and a navigation service) and user contents (e.g., movies and music), thereby increasing vehicle safety and/or user convenience.

The mobile communication module included in the communicator 2100 may communicate with another device located at a remote place (e.g., the electronic device 1000) through a communication network complying with a communication standard such as 3G, 4G, and/or 5G. Herein, the communication module for communicating with the other device located at a remote place may be referred to as 'a telecommunication module'. In an embodiment of the disclosure, the communicator 2100 may transmit and receive data to and from the data communication module 1120 of the electronic device 1000 in a wired or wireless manner.

The processor 2200 controls overall operations of the server 2000. For example, the processor 2200 may perform operations by executing at least one of one or more instructions and programs of the server 2000.

The DB 2300 may include a memory (not shown), and the memory (not shown) may store at least one of one or more instructions, programs, or data utilized for the server 2000 to perform a certain operation. The DB 2300 may also store data utilized for the server 2000 to perform computation based on a neural network.

In the disclosed embodiment of the disclosure, the server 2000 may store the neural network 150 described above in relation to FIG. 15. The neural network 150 may be stored in at least one of the processor 2200 or the DB 2300. The neural network 150 included in the server 2000 may be a trained neural network.

The server 2000 may transmit the trained neural network through the communicator 2100 to the data communication module 1120 of the electronic device 1000. Then, the electronic device 1000 may obtain and store the trained neural network, and obtain desired output data through the neural network.

A program executed by the electronic device 1000 described herein may be implemented as a hardware component, a software component, and/or a combination of hardware and software components. The program may be executed by all systems capable of executing computer-readable instructions.

The software may include a computer program, codes, instructions, or a combination thereof, and configure a processing apparatus to operate as desired or independently or collectively instruct the processing unit.

The software may be implemented as a computer program including instructions stored in a computer-readable storage medium. Examples of the computer-readable storage medium include magnetic storage media (e.g., read-only memory (ROM), random access memory (RAM), floppy disks, and hard disks) and optical reading media (e.g., CD-ROMs and digital versatile discs (DVDs)). The computer-readable storage medium may be distributed over network-coupled computer systems so that computer-readable codes are stored and executed in a distributed fashion. The medium may be read by a computer, stored in memory, and executed by a processor.

The computer-readable storage medium may be provided in the form of a non-transitory storage medium. When the storage medium is 'non-transitory', it means that the storage medium does not include signals and is tangible, and it does not limit that data is semi-permanently or temporarily stored in the storage medium. For example, the 'non-transitory storage medium' may include a buffer for temporarily storing data.

A program according to the disclosed embodiments of the disclosure may be included and provided in a computer program product. The computer program product may be traded between a seller and a purchaser as a commodity.

The computer program product may include a software program, and a computer-readable storage medium storing the software program. For example, the computer program product may include a product (e.g., a downloadable application) that is electronically distributed in the form of a software program by a manufacturer of the electronic device 1000 or via an electronic market (e.g., Google Play Store or App Store). For electronic distribution, at least a part of the software program may be stored in a storage medium or be temporarily generated. In this case, the storage medium may be a server of the manufacturer of the vehicle or the electronic device 1000, a server of the electronic market, or a storage medium of a relay server that temporarily stores the software program.

In a system including the electronic device 1000, the server 2000, and another electronic device, the computer program product may include a storage medium of the server 2000 (see FIGS. 16 and 17) or the electronic device 1000. Otherwise, when a third device (e.g., a smartphone) connected to the electronic device 1000 is present, the computer program product may include a storage medium of the third device. Alternatively, the computer program product may include a software program itself transmitted from the electronic device 1000 to the server 2000 or the third device, or from the third device to the electronic device 1000.

In this case, one of the electronic device 1000, the server 2000, and the third device may execute the computer program product to perform the method according to the disclosed embodiments of the disclosure. Alternatively, two or more of the electronic device 1000, the server 2000, and the third device may execute the computer program product to perform the method according to the disclosed embodiments of the disclosure in a distributed fashion.

For example, the electronic device 1000 may execute the computer program product stored in the memory 1300 (see FIG. 2), to control another electronic device connected to the electronic device 1000, to perform the method according to the disclosed embodiments of the disclosure.

As another example, the third device may execute the computer program product to control the electronic device 1000 connected to the third device, to perform the method according to the disclosed embodiments of the disclosure.

When the third device executes the computer program product, the third device may download the computer program product from the electronic device 1000 and execute the downloaded computer program product. Alternatively, the third device may execute the computer program product provided in a preloaded state, to perform the method according to the disclosed embodiments of the disclosure.

While the disclosure has been particularly shown and described with reference to embodiments thereof, it will be understood by one of ordinary skill in the art that various changes in form and details may be made therein. For example, suitable results may also be achieved when the described techniques are performed in a different order and/or when components of the described computer system or module are coupled or combined in a different manner or are replaced or substituted by other components or their equivalents.

What is claimed is:

1. An electronic device mounted in a vehicle, the electronic device comprising:
   a display;
   a memory storing voice commands executable by voice input to execute one or more functions of the vehicle or the electronic device, and a program including one or more instructions; and
   at least one processor configured to execute the one or more instructions to cause the electronic device to:

obtain status information including at least one of vehicle driving information, occupant information, or display output information, generate one or more short commands by shortening one or more of the voice commands, based on the obtained status information, generate one or more voice command guidance user interfaces (UIs) for representing the one or more short commands, determine a safe speed based on at least one of a current location, a driving road, and a driving speed of the vehicle included in the vehicle driving information, determine weights of the one or more voice command guidance UIs based on the driving speed of the vehicle and the safe speed, determine a number, location, and size of the one or more voice command guidance UIs to be displayed, based on the determined weights, and control the display to display the one or more voice command guidance UIs based on the determined number, the determined location, and the determined size, wherein the at least one processor is further configured to execute the one or more instructions to cause the electronic device to adjust, based on a result of comparing the driving speed of the vehicle with the safe speed, a first weight of a first voice command guidance UI for executing driving-related functions of the vehicle from among the one or more voice command guidance UIs and a second weight of a second voice command guidance UI for executing convenience-related functions unrelated to driving of the vehicle from among the one or more voice command guidance UIs.

2. The electronic device of claim 1, wherein the at least one processor is further configured to execute the one or more instructions to cause the electronic device to:

obtain a user identification and a usage history for an occupant of the vehicle, and detect one or more applications that are frequently-used by the occupant, based on the user identification and the usage history, wherein the one or more of the voice commands are selected for generation of the one or more short commands based on association with the detected one or more frequently-used applications.

3. The electronic device of claim 1, wherein the display comprises a plurality of displays, and wherein each display corresponds in position to a seat included within the vehicle, and wherein the at least one processor is further configured to execute the one or more instructions to cause the electronic device to:

receive, from an occupant on the vehicle, a user input requesting a voice recognition function, in response to the user input, activate the voice recognition function on a display from among the plurality of displays corresponding to a seat occupied by an occupant, and control the display to display the one or more voice command guidance UIs.

4. The electronic device of claim 1, wherein the at least one processor is further configured to execute the one or more instructions to cause the electronic device to:

adjust a third weight of a third voice command guidance UI for executing a function of removing a pop-up message from the display, in a case that the pop-up message is displayed overlaying on a UI displayed on the display.

5. The electronic device of claim 1, wherein the at least one processor is further configured to execute the one or more instructions to cause the electronic device to:

determine a display area for displaying the one or more voice command guidance UIs, based on a distance between a location of an occupant within the vehicle, and the display, and control the display to display the one or more voice command guidance UIs on the determined display area.

6. A method of operating an electronic device mounted in a vehicle, the method comprising:

storing, in a memory, voice commands executable by voice input to execute one or more functions of the vehicle or the electronic device;

obtaining status information including at least one of vehicle driving information, occupant information, or display output information;

generating, via at least one processor, one or more short commands by shortening one or more of the voice commands, based on the obtained status information;

generating one or more voice command guidance user interfaces (UIs) for representing the one or more short commands;

determining a safe speed based on at least one of a current location, a driving road, and a driving speed of the vehicle included in the vehicle driving information;

determine weights of the one or more voice command guidance UIs based on the driving speed of the vehicle and the safe speed;

determine a number, location, and size of the one or more voice command guidance UIs to be displayed, based on the determined weights; and displaying the one or more voice command guidance UIs based on the determined number, the determined location, and the determined size, wherein the determining of the weights of the one or more voice command guidance UIs comprises:

adjusting, based on a result of comparing the driving speed of the vehicle with the safe speed, a first weight of a first voice command guidance UI for executing driving-related functions of the vehicle from among the one or more voice command guidance UIs and a second weight of a second voice command guidance UI for executing convenience-related functions unrelated to driving of the vehicle from among the one or more voice command guidance UIs.

7. The method of claim 6, wherein the obtaining of the information comprises:

obtaining a user identification and a usage history for an occupant of the vehicle; and detecting one or more applications that are frequently-used by the occupant, based on the user identification and the usage history, wherein the one or more of the voice commands are selected for generation of the one or more short commands based on association with the detected one or more frequently-used applications.

8. The method of claim 6, wherein the display comprises a plurality of displays, and wherein each display corresponds in position to a seat included within the vehicle, the method further comprising:

receiving, from an occupant on the vehicle, a user input requesting a voice recognition function;

in response to the user input, activating the voice recognition function on a display from among the plurality of displays corresponding to a seat occupied by an occupant; and controlling the display to display the one or more voice command guidance UIs.

9. The method of claim 6, wherein the determining of the weights of the one or more voice command guidance UIs comprises adjusting a third weight of a third voice command guidance UI for executing a function for removing a pop-up message from a display in a case that the pop-up message is output to be overlaid on GUIs displayed on the display.

10. The method of claim 6, further comprising:
determining a display area for displaying the one or more voice command guidance UIs, based on a distance between a location of an occupant within the vehicle, and the display; and displaying on the display the one or more voice command guidance UIs on the determined display area.

11. A computer program product comprising a non-transitory computer-readable storage medium having instructions executable by an electronic device mounted in a vehicle for performing:
storing, in a memory, voice commands executable by voice input to execute one or more functions of the vehicle or the electronic device;

obtaining status information including at least one of vehicle driving information, occupant information, or display output information;

generating, via at least one processor, one or more short commands by shortening one or more of the voice commands, based on the obtained status information;

generating one or more voice command guidance user interfaces (UIs) for representing the one or more short commands;

determining a safe speed based on at least one of a current location, a driving road, and a driving speed of the vehicle included in the vehicle driving information;

determine weights of the one or more voice command guidance UIs based on the driving speed of the vehicle and the safe speed;

determine a number, location, and size of the one or more voice command guidance UIs to be displayed, based on the determined weights; and displaying the one or more voice command guidance UIs based on the determined number, the determined location, and the determined size, wherein the determining of the weights of the one or more voice command guidance UIs comprises:

adjusting, based on a result of comparing the driving speed of the vehicle with the safe speed, a first weight of a first voice command guidance UI for executing driving-related functions of the vehicle from among the one or more voice command guidance UIs and a second weight of a second voice command guidance UI for executing convenience-related functions unrelated to driving of the vehicle from among the one or more voice command guidance UIs.

* * * * *